(12) United States Patent
Pilgrim et al.

(10) Patent No.: US 12,054,268 B2
(45) Date of Patent: Aug. 6, 2024

(54) HYBRID PROPULSION SYSTEM INCLUDING ELECTRIC MOTOR WITH FAN SHROUD ENCIRCLING INTEGRATED FAN BLADES

(71) Applicant: Duxion Motors, Inc., St. Johns's (CA)

(72) Inventors: Rick Ralph Pilgrim, Grand Falls-Windsor (CA); Sheikh Fazle Rabbi, St. John's (CA); Richard Robert Roper, Katy, TX (US)

(73) Assignee: Duxion Motors, Inc., St John's (CA)

( * ) Notice: Subject to any disclaimer, the term of this patent is extended or adjusted under 35 U.S.C. 154(b) by 0 days.

(21) Appl. No.: 17/969,451

(22) Filed: Oct. 19, 2022

(65) Prior Publication Data
US 2023/0124726 A1 Apr. 20, 2023

Related U.S. Application Data

(60) Provisional application No. 63/312,803, filed on Feb. 22, 2022, provisional application No. 63/257,378, filed on Oct. 19, 2021.

(51) Int. Cl.
| | |
|---|---|
| *B64D 27/10* | (2006.01) |
| *B64D 27/02* | (2006.01) |
| *B64D 27/24* | (2024.01) |
| *F01D 15/10* | (2006.01) |

(52) U.S. Cl.
CPC .............. *B64D 27/24* (2013.01); *B64D 27/10* (2013.01); *F01D 15/10* (2013.01); *B64D 27/026* (2024.01); *F05D 2220/76* (2013.01)

(58) Field of Classification Search
CPC .. B64D 2027/026; B64D 27/10; B64D 27/24; F01D 15/10; F05D 2220/76
USPC ........................................................... 244/60
See application file for complete search history.

(56) References Cited

U.S. PATENT DOCUMENTS

| | | | |
|---|---|---|---|
| 10,703,496 B2 | 7/2020 | Vondrell et al. | |
| 10,717,539 B2 | 7/2020 | Menheere | |
| 2009/0121073 A1* | 5/2009 | Doane | B64C 29/0066 244/129.4 |
| 2015/0308383 A1* | 10/2015 | Hoffjann | B64D 27/24 60/269 |
| 2018/0283220 A1* | 10/2018 | Duce | F01D 25/36 |
| 2018/0304753 A1 | 10/2018 | Vondrell et al. | |
| 2020/0039657 A1 | 2/2020 | Ransom et al. | |
| 2020/0040846 A1* | 2/2020 | Lugg | F02K 3/072 |
| 2020/0324906 A1 | 10/2020 | Vondrell et al. | |
| 2021/0355893 A1* | 11/2021 | Frantz | H02K 7/1823 |

(Continued)

FOREIGN PATENT DOCUMENTS

| | | |
|---|---|---|
| EP | 3392148 | 10/2018 |
| EP | 3748146 | 12/2020 |

*Primary Examiner* — Brady W Frazier
(74) *Attorney, Agent, or Firm* — Fletcher Yoder, P.C.

(57) ABSTRACT

A system includes a first electric motor that when in operation imparts rotation to a fan stage of an engine. The system also includes a combustion section of the engine comprising a combustor that when in operation generates combustion gas through ignition of fuel and compressed air. The system further includes a turbine of the engine coupled to a shaft of the engine, wherein the turbine when in operation receives the combustion gas from the combustion section and imparts rotation to the shaft using the combustion gas.

10 Claims, 17 Drawing Sheets

(56) References Cited

U.S. PATENT DOCUMENTS

2021/0396147 A1* 12/2021 Charier .................. H02K 21/14
2022/0017207 A1*  1/2022 Princen ................. B64C 11/001

* cited by examiner

HYBRID PROPULSION SYSTEM INCLUDING ELECTRIC MOTOR WITH FAN SHROUD ENCIRCLING INTEGRATED FAN BLADES

CROSS REFERENCE TO RELATED APPLICATIONS

This application is a Non-Provisional Application claiming priority to U.S. Provisional Patent Application No. 63/312,803, entitled "Hybrid Propulsion System", filed Feb. 22, 2022, and U.S. Provisional Application No. 63/257,378, entitled "Hybrid Propulsion System", filed Oct. 19, 2021, which are herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances and technologies deployed in the automotive industry have allowed for an increase in the number of hybrid gas-electric automobiles in use. Hybrid automobiles allow for the reduction of fuel consumption and the emissions associated therewith. In contrast, propulsion systems for aircraft typically continue to utilize traditional gas turbine engines.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

There is a large opportunity for hybridization of new and/or existing aircraft propulsion systems, such as, turboprop engines, turboshaft engines, and the like. While new aircraft propulsion systems can be implemented that utilize the described systems herein, the present hybrid-propulsion systems (i.e., that allow for both gas and electric propulsion) also can be retrofitted to existing aircraft propulsion systems to allow for, for example, increases in efficiency relative to existing gas only aircraft propulsion systems. Similar techniques can be applied to jet engines, such as turbofan or turbojet engines for example.

Figure 1:
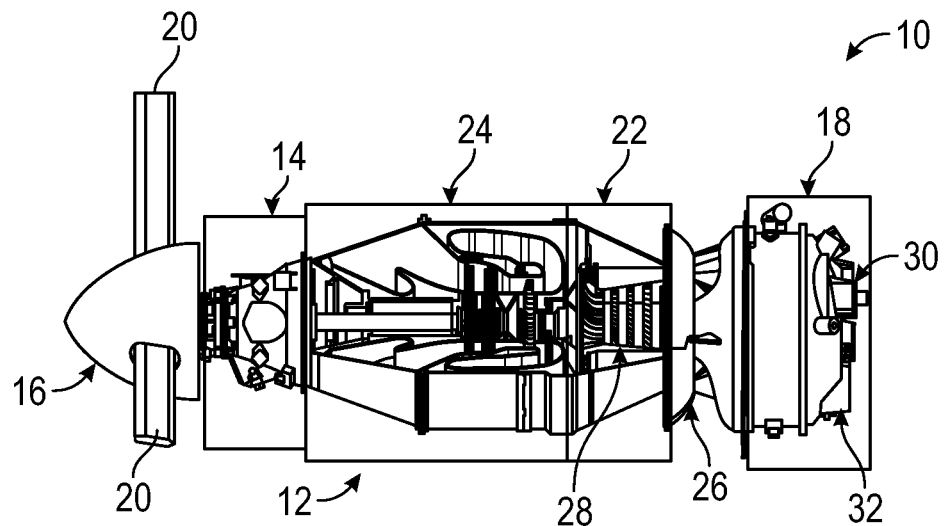
FIG. 1 illustrates a side view of a first propulsion system, in accordance with an embodiment.

With the foregoing in mind, FIG. 1 illustrates side view of a propulsion system 10 that may be used in conjunction with, for example, an aircraft. In some embodiments, the propulsion system 10 is a turboprop aircraft engine that is a gas powered engine. While the propulsion system 10 is illustrated as a turboprop engine, it should be appreciated that the propulsion system 10 may instead be a turboshaft engine, a turbofan engine, or other types of aircraft engines. The propulsion system 10 includes a turbine 12, a reduction gearbox 14, a propeller assembly 16, and an auxiliary gearbox 18. The turbine 12 generally operates to rotate a shaft to impart (via the reduction gearbox 14) rotation of the propeller assembly 16. When rotated, blades 20 of the propeller assembly 16 create mechanical thrust.

As illustrated, the turbine 12 is divided into two sections; a cold section 22 and a hot section 24. The cold section 22 of the turbine 12 includes one or more air inlets 26 (e.g., air intakes) that may be, for example, circumferentially disposed about the turbine 12. The cold section 22 of the turbine 12 also includes a gas generator section 28. The gas generator section 28 when in operation compresses air (i.e., ambient air) received from the one or more air inlets 26. The compressed (i.e., pressurized) air generated by the gas generator section 28 is conveyed to the second section of the turbine, namely the hot section 24.

The hot section 24 of the turbine 12 receives the compressed air from the cold section 22, mixes the compressed air with fuel, and ignites the mixture to generate a combustion gas. This combustion gas can be utilized to power multiple turbines. For example, the combustion gas can be utilized to drive one or more turbines in the cold section 22 of the turbine 12 to generate the compressed air. Additionally, the combustion gas can be utilized to drive one or more power turbines to impart rotation to the propeller assembly 16 (via the reduction gearbox 14).

The auxiliary gearbox 18 (e.g., accessory gearbox) operates to drive accessories of the propulsion system 10, such as generators, hydraulic pumps, oil pumps, etc. Also included in (or coupled to) the auxiliary gearbox is a starter that can be utilized in starting the propulsion system 10, for example, starting rotation of turbines in the gas generator section 28. As illustrated, the auxiliary gearbox 18 can include a starter generator mounting face 30, which can be coupled to, for example, a starter that is external to the propulsion system 10. Likewise, the auxiliary gearbox 18 can include an oil pump mounting face 32, which can be coupled to, for example, an oil pump that is external to the propulsion system 10.

In conjunction with the operation of the propulsion system 10 described above, FIG. 2 illustrates a cross-sectional side view of the propulsion system 10 that has been sectioned to better illustrate elements therein. As illustrated, the cold section 22 of the propulsion system 10 includes one or more compressor stator stages 34 that can include stators having fixed blades to operate a diffusers in each stage as well as compressors that operate as rotors having blades that impel air. The rotation of the compressors causes the air to flow through the compressor stator stages 34 to increase the velocity of the airflow. The cold section 22 also includes a compressor impeller 36 downstream of the one or more compressor stator stages 34. The compressor impeller 36 operates by rotating blades to impel air received from the one or more compressor stator stages 34 towards the hot section 24 as compressed air.

The compressed air is transmitted to one or more combustion chambers 38, where it is mixed with fuel and the mixture is ignited, generating (heated) combustion gas. This combustion gas is transmitted past a compressor turbine 40, which is rotated when the combustion gas passes across blades of the compressor turbine 40, causing rotation to a compressor shaft coupled to the compressor turbine 40. This compressor shaft is also connected to the compressor impeller 36 (as well as, for example, the compressors of the one or more compressor stator stages 34) such that rotation of the compressor shaft causes additional rotation of the compressor impeller 36 (and the compressors of the one or more compressor stator stages 34).

The combustion gas, subsequent to rotating the compressor turbine 40, also passes through one or more power turbines 42. The one or more power turbines 42 include blades that cause rotation of the one or more power turbines 42 when the combustion gas passes across the blades. The one or more power turbines 42 are also coupled to a power turbine shaft 44 that rotates based upon the rotation of the one or more power turbines 42. This power turbine shaft is coupled to the reduction gearbox 14, which may operate to transmit rotation from the power turbine shaft 44 to a propeller drive shaft 46 coupled to a hub 48 of the propeller assembly 16. The reduction gearbox 14 may operate as a gearing mechanism that alters the rotation speed between the power turbine shaft 44 and the propeller drive shaft 46.

Figure 2:
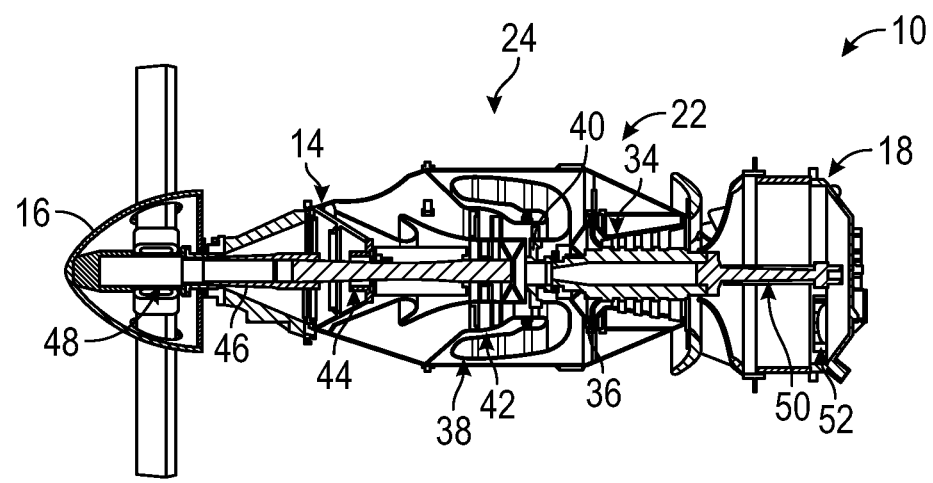
FIG. 2 illustrates a cross-sectional side view of the first propulsion system of FIG. 1, in accordance with an embodiment.

Also illustrated in FIG. 2 is an auxiliary gearbox main shaft 50 and a starter motor spur gear 52 in the auxiliary gearbox 18. The auxiliary gearbox 18 auxiliary gearbox main shaft 50 may be coupled to or may include the compressor shaft and may operate to impart rotation to the compressor impeller 36 and/or may operate to drive accessories of the propulsion system 10, such as generators, hydraulic pumps, oil pumps, etc. The starter motor spur gear 52 is part of (and/or represents) a starter gear train that operates as a gearing mechanism that alters the rotation speed between a starter generator and the auxiliary gearbox main shaft 50 during, for example, starting of an aircraft such that the extra rotation of the auxiliary gearbox main shaft 50 is used to increase compression of the compressor impeller 36 as well as, for example, rotation of the compressors of the one or more compressor stator stages 34.

Figure 3:
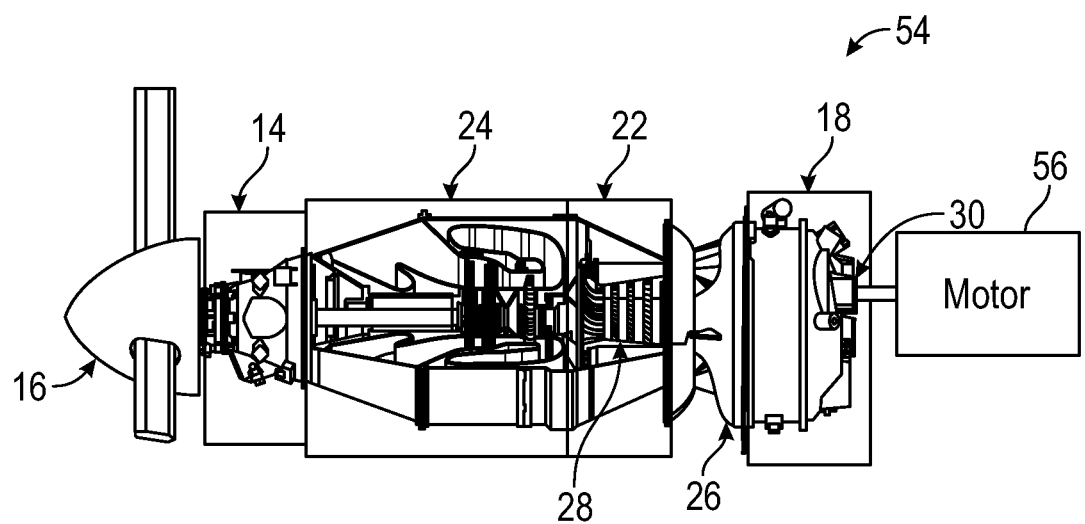
FIG. 3 illustrates a side view of a second propulsion system, in accordance with an embodiment.

In this manner, FIGS. 1 and 2 represent an example of a gas turbine engine. However, in some embodiments, it may be beneficial to increase the efficiency of the propulsion system 10. Accordingly, FIG. 3 illustrates an example of a propulsion system 54 that is a hybrid gas turbine propulsion system. For example, the propulsion system 54 may include an electric motor 56 in addition to the elements of the propulsion system 10 described above with respect to FIGS. 1 and 2. It should be noted that the electric motor 56 can be a single electric motor 56 or, for example, a plurality of electric motors 56 (e.g., two or more motors in tandem). Furthermore, the electric motor 56 can include, for example, one stator and one or more rotors. As illustrated, the electric motor 56 can be coupled to the auxiliary gearbox 18 via, for example, the starter generator mounting face 30 and can replace the starter that would otherwise be coupled to the starter generator mounting face 30. It should be noted that other locations of connection between the auxiliary gearbox 18 and the electric motor 56 may be utilized.

Figure 4:
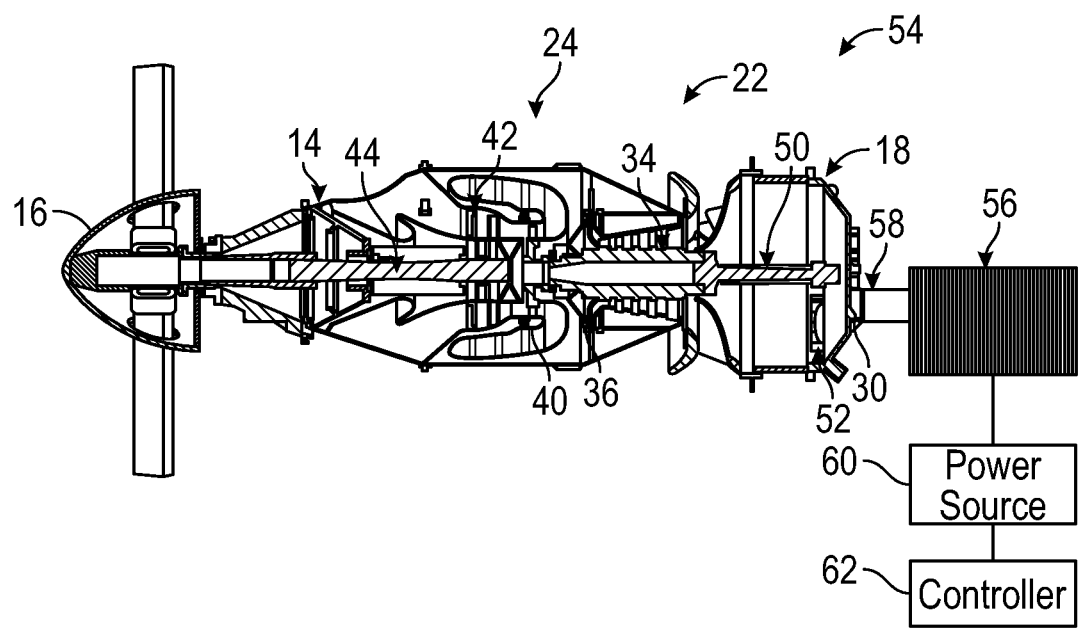
FIG. 4 illustrates a cross-sectional side view of the second propulsion system of FIG. 3, in accordance with an embodiment.

As additionally illustrated in FIG. 4, which shows a cross-sectional side view of the propulsion system 54 that has been sectioned to better illustrate elements therein, the electric motor 56 is coupled to a motor shaft 58 and operates to rotate the motor shaft 58. The electric motor 56 can be connected directly to the motor shaft 58 or can be connected to the motor shaft 58 through a set of gears or via a mechanical coupler, such as a chain, one or more belts, one or more pulleys, and the like. The motor shaft 58 is coupled via, for example, the starter generator mounting face 30 to the starter motor spur gear 52 to alter the rotation speed between the motor shaft 58 driven by the electric motor 56 and the auxiliary gearbox main shaft 50 during, for example, starting of an aircraft. As noted above, in place of a conventional starter, the electric motor 56 is used to bring the revolutions per minute (RPMs) of the compressor impeller 36 (as well as, for example, the compressors of the one or more compressor stator stages 34) to a predetermined level at which self propelling is performed.

In addition, and in contrast to the replaced starter motor, the electric motor 56 additionally can and is utilized to augment engine power/compressor rotation (i.e., during other operating conditions of the propulsion system 54 in addition to starting the propulsion system 54). In some embodiments, torque is transferred from the motor shaft 58 to the starter motor spur gear 52, then to the auxiliary gearbox main shaft 50. The auxiliary gearbox main shaft 50 rotates with, for example, the compressor impeller 36 as well as, for example, the compressors of the one or more compressor stator stages 34. Torque generated by the electric motor 56 will be transferred using the previously stated path, powering the compressor(s) 36 and in compressor stator stages 34, thereby creating the hybrid effect for powering the propulsion system 54. The remaining sections of the propulsion system 54 (e.g., the hot section 24, the reduction gearbox 14, the propeller assembly 16, etc.) remain unchanged and function as described above with respect to FIGS. 1 and 2. With illustrated configuration of the propulsion system 54 of FIGS. 3 and 4, the orientation of the electric motor 56 is in an ambient environment which has a temperature well below the maximum operating temperature of the electric motor 56. That is, the location of the electric motor 56 allows for operation in a favorable ambient temperature environment. In addition, because the electric motor 56 is connected to the a high RPM compressor (e.g., the compressor impeller 36), the overall footprint of the electric motor 56 can be kept smaller due to the low torque high RPM requirements of the cold section 22.

As further illustrated in FIG. 4, a power source 60 may be coupled to the electric motor 56. The power source 60 may include one or more of, for example, one or more batteries, one or more fuel cells, one or more auxiliary power units (APUs), and/or similar sources of electric power. The one or more APUs may be electric generators that, for example, are disposed in one or more of the cold section 22, the hot section 24, or in another location of the propulsion system 54 and operate to convert rotational torque received from of one or more of the shafts of the propulsion system 54 described above into electrical power. Additionally, a controller 62 may be included to control the amount of power transmitted to the electric motor in conjunction with a particular operation of the propulsion system 54. For example, during a starting operation, the controller may operate to allow for an increased amount of power to be transmitted from the power source 60 to the electric motor relative to a cruising operation when the aircraft is at a stable airspeed (i.e., the controller can determine various levels of power to be provided to the electric motor 56 that coincide with particular operations of the propulsion system 54).

The controller 62 may be part of a larger computing system or control system or a standalone unit electric power controller. In some embodiments, the controller 62 may be communicatively coupled to a main control system, for example, a control system in a cockpit of an aircraft that may provide a centralized control system for one or more portions of the propulsion system 54. The controller 62 and/or any computing or control system associated therewith, may operate in conjunction with software systems implemented as computer executable instructions stored in a (tangible) non-transitory machine readable medium, such as memory, a hard disk drive, or other short term and/or long term storage. Particularly, the techniques to described below with respect to control of aspects of the power source and/or other components of the propulsion system 54 may be accomplished, for example, using code or instructions stored in the non-transitory machine readable medium and may be executed, for example, by the controller 62 as well as by additional separate controllers controlling aspects of the operation of the propulsion system 54 that are separate from the operation of the electric motor 56.

The controller 62 may be a general purpose or a special purpose processing device, such as one or more application specific integrated circuits (ASICs), one or more processors, or another processing device that interacts with one or more tangible, non-transitory machine-readable medium (e.g., machine readable media) that collectively stores instructions executable by the controller 62 to perform the methods and actions described herein. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the controller 62. In some embodiment, the instructions executable by the controller 62 are instead generated and transmitted to the controller 62 via separate processing device of a computing system and are used to generate, for example, control signals or input signals to effect control of the power source and/or the electric motor 56.

Any computing system controlling the controller 62 or control system inclusive of the controller 62 may also include one or more input structures (e.g., one or more of a keypad, mouse, touchpad, touchscreen, one or more switches, buttons, or the like) to allow a user to interact with the computing system, for example, to start, control, or operate a graphical user interface (GUI) or applications running on the computing system and/or to start, control, or operate, for example, components utilized in a particular propulsion system 54 operation. Alternatively, the control system of computing system operating the controller 62 may instead automatically control the operation of the controller 62 based either on inputs from a user or measured inputs of the propulsion system 54 that correspond to predetermined operations.

Figure 5:
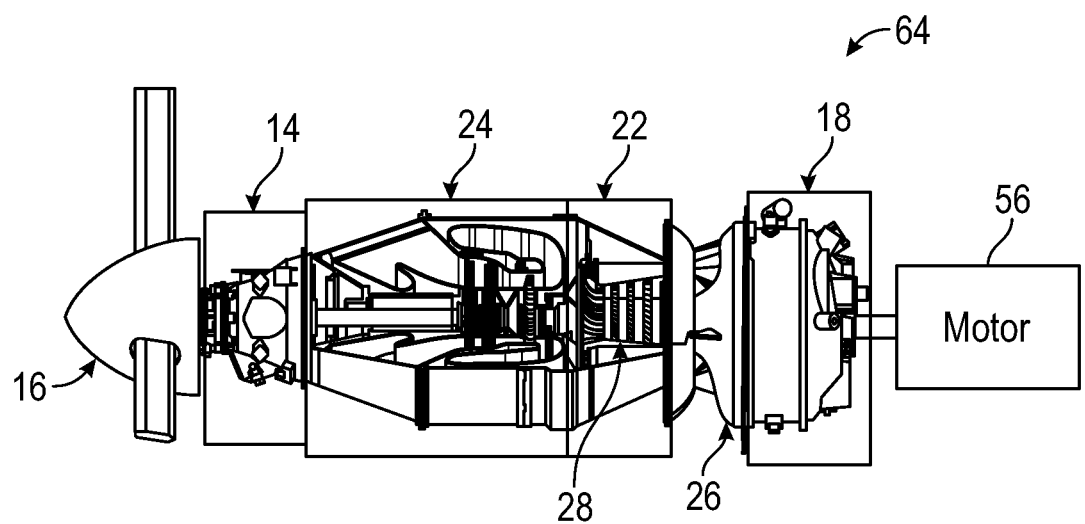
FIG. 5 illustrates a side view of a third propulsion system, in accordance with an embodiment.
Figure 6:
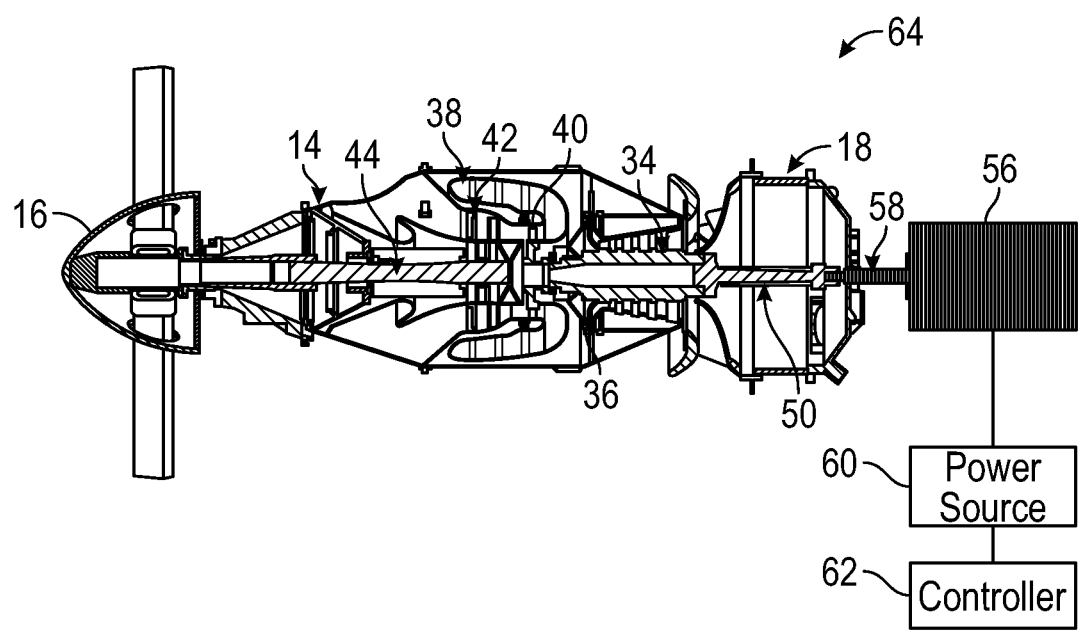
FIG. 6 illustrates a cross-sectional side view of the third propulsion system of FIG. 5, in accordance with an embodiment.

While FIGS. 3 and 4 illustrate one technique and system to provide hybridization of the gas turbine engine of FIGS. 1 and 2, there may be other configurations that are instead chosen. For example, FIGS. 5 and 6 represent a propulsion system 64 that utilizes a different manner to couple the electric motor 56 to the auxiliary gearbox 18. It should be noted that the electric motor 56 can be a single electric motor 56 or, for example, a plurality of electric motors 56 (e.g., two or more motors in tandem). Furthermore, the electric motor 56 can include, for example, one stator and one or more rotors. As illustrated in FIG. 5, and in the cross-sectional side view of the propulsion system 64 that has been sectioned to better illustrate elements therein of FIG. 6, the electric motor 56 is directly coupled to (or otherwise integrated with) the auxiliary gearbox main shaft 50 via the motor shaft 58. In this manner, the auxiliary gearbox main shaft 50 operates as a bridge between the compressors of the one or more compressor stator stages 34 as well as, for example the compressor impeller 36, and any auxiliary spur gears present in the auxiliary gearbox 18. Additionally, the electric motor 56 can be connected directly to the motor shaft 58 or can be connected to the motor shaft 58 through a set of gears or via a mechanical coupler, such as a chain, one or more belts, one or more pulleys, and the like.

In some embodiments, the auxiliary gearbox main shaft 50 can be used to drive the compressor section(s) (i.e., the one or more compressor stator stages 34 as well as, for example the compressor impeller 36) or can be driven by the compressor section(s). Furthermore, in some embodiments, the electric motor 56 can be mounted to a housing cover of the auxiliary gearbox 18 and, for example, a new aperture can be formed in the housing cover to allow for the direct interface of the motor shaft 58 with the auxiliary gearbox main shaft 50. In this manner, torque is transferred from the motor shaft 58 directly to the auxiliary gearbox main shaft 50. This then rotates the compressors of the one or more compressor stator stages 34 as well as, for example the compressor impeller 36. Furthermore, the torque transferred by the electric motor 56 can augment the powering of the compressor(s), thereby creating the hybrid effect for powering the propulsion system 64. The remaining sections of the propulsion system 64 (e.g., the hot section 24, the reduction gearbox 14, the propeller assembly 16, etc.) remain unchanged and function as described above with respect to FIGS. 1 and 2.

With illustrated configuration of the propulsion system 64 of FIGS. 5 and 6, the orientation of the electric motor 56 is in an ambient environment which has a temperature well below the maximum operating temperature of the electric motor 56. That is, the location of the electric motor 56 allows for operation in a favorable ambient temperature environment. Moreover, since the electric motor 56 is connected to the a high RPM compressor (e.g., the compressor impeller 36), the overall footprint of the electric motor 56 can be kept smaller due to the low torque high RPM requirements of the cold section 22. Due also to the direct connection of the electric motor 56 in FIGS. 5 and 6, the illustrated configuration can also allow for a higher electrical power injection into the propulsion system 64 relative to the configuration illustrated in FIGS. 3 and 4, thus reducing additional fuel consumption.

Figure 7:
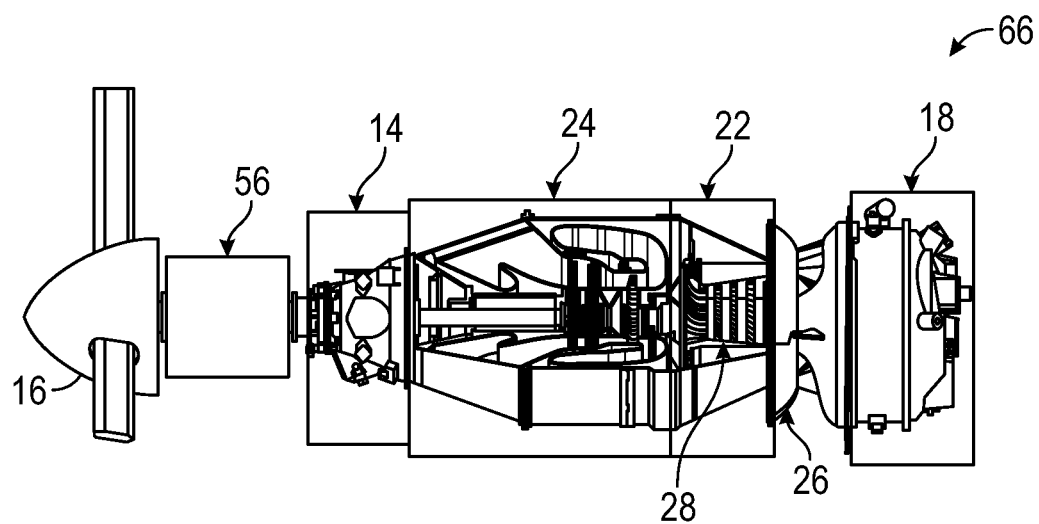
FIG. 7 illustrates a side view of a fourth propulsion system, in accordance with an embodiment.
Figure 8:
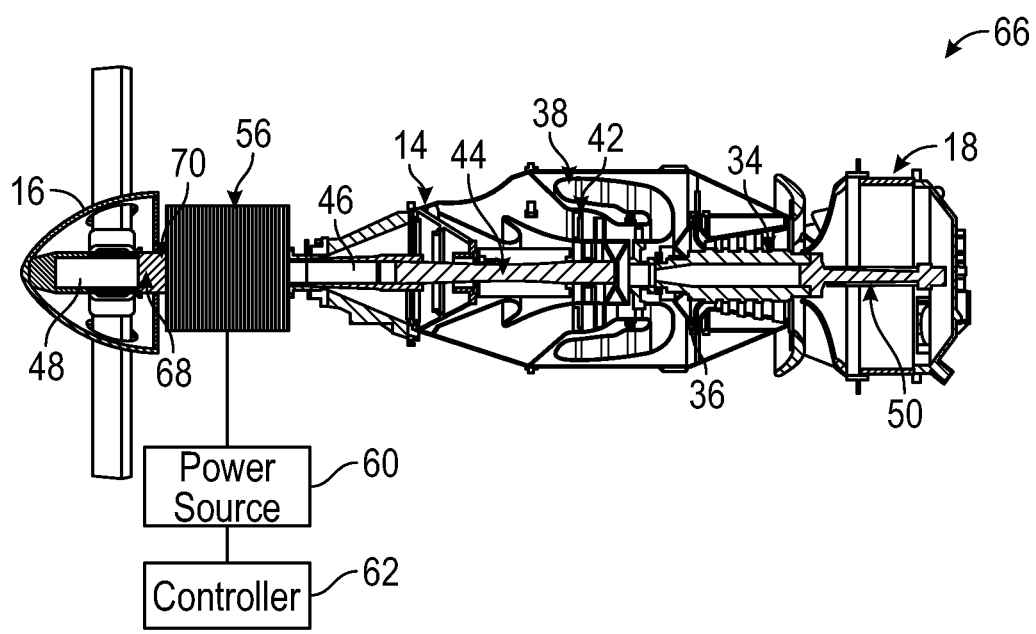
FIG. 8 illustrates a cross-sectional side view of the fourth propulsion system of FIG. 7, in accordance with an embodiment.

FIGS. 7 and 8 represent another technique and system to provide hybridization of the gas turbine engine of FIGS. 1 and 2, specifically propulsion system 66 that includes coupling the electric motor 56 to the propeller assembly 16. It should be noted that the electric motor 56 can be a single electric motor 56 or, for example, a plurality of electric motors 56 (e.g., two or more motors in tandem). Furthermore, the electric motor 56 can include, for example, one stator and one or more rotors. As illustrated in FIG. 7, and in the cross-sectional side view of the propulsion system 66 that has been sectioned to better illustrate elements therein of FIG. 8, the electric motor 56 is directly coupled to (or otherwise integrated with) a motor shaft 68 of the propeller assembly 16. The motor shaft 68 may be a part of, for example, the propeller drive shaft 46. Accordingly, as illustrated in FIG. 8, the electric motor is attached to the reduction gearbox 14 via (for example, the propeller drive shaft 46) and the motor shaft 68 is coupled to the hub 49 of the propeller assemble 16 via, for example, a propeller hub mounting flange 70.

Thus, in contrast to the embodiments illustrated in FIGS. 1-6 in which the propeller assembly 16 attaches directly to the reduction gearbox 14 via, for example, a hub mounting flange, the propulsion system 66 illustrated in FIGS. 7 and 8 provides for the insertion of the electric motor 56 between the propeller assembly 16 and the hub mounting flange. The motor shaft 68 is attached directly to the propeller assembly 16 and the motor shaft 68 is also attached, for example, to the power turbine shaft 44 using the propeller hub mounting flange 70 (with, for example, the propeller drive shaft 46 as the power turbine shaft 44 or via the propeller drive shaft 46). Due to the location of the electric motor 56 in FIGS. 7 and 8, the electric motor 56 may be a high torque-low RPM motor with a large diameter to length ratio.

The torque produced by the electric motor 56 operates to power (e.g., rotate) the propeller of the propeller assembly 16 in addition to the shaft work produced by the power turbines 42. This augmented power generation creates the hybrid effect in the propulsion system 66. The remaining sections of the propulsion system 66 (e.g., the hot section 24, the reduction gearbox 14, the propeller assembly 16, etc.) remain unchanged and function as described above with respect to FIGS. 1 and 2. Furthermore, the illustrated orientation in FIGS. 7 and 8 is attractive since the electric motor 56 is in an ambient environment which has a temperature well below the maximum operating temperature of the electric motor 56. The orientation of the propulsion system 66 also avoids the need to change any OEM components due to motor torque, since the electric motor 56 is attached to sufficient parts. In some embodiments, the orientation in FIGS. 7 and 8 can provide for a simpler engine augmentation, since no components related to air pressure or flow generation are being modified. Additionally, less fuel can be burned and the electric motor 56 can make up for lost power. Finally, in comparison to the orientations in FIGS. 3 and 4 and FIGS. 5 and 6, the configuration in FIGS. 7 and 8 can allow for a pure electric operation of the engine in addition to operation in a hybrid mode.

Figure 9:
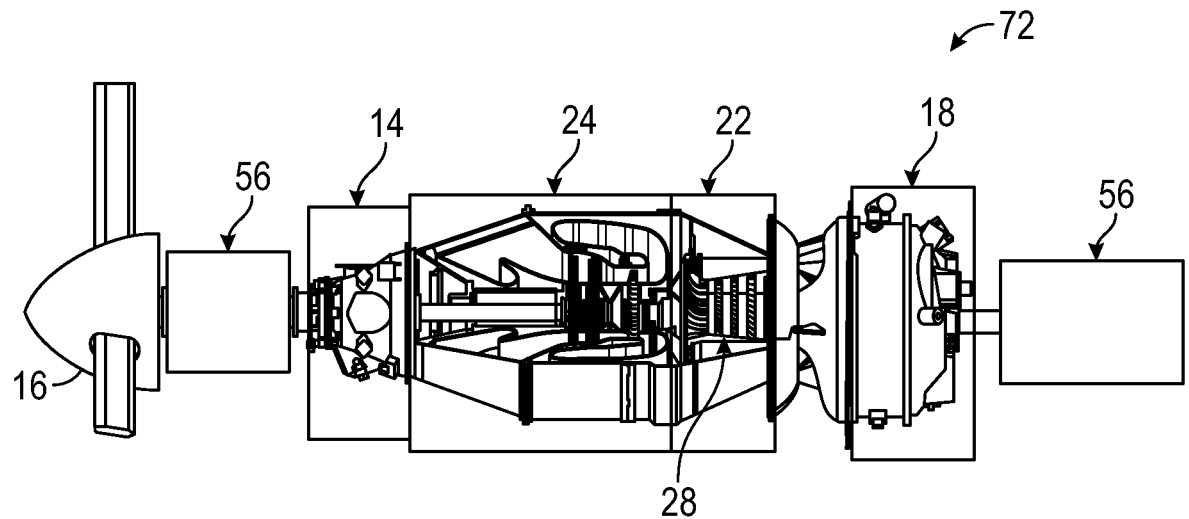
FIG. 9 illustrates a side view of a fifth propulsion system, in accordance with an embodiment.
Figure 10:
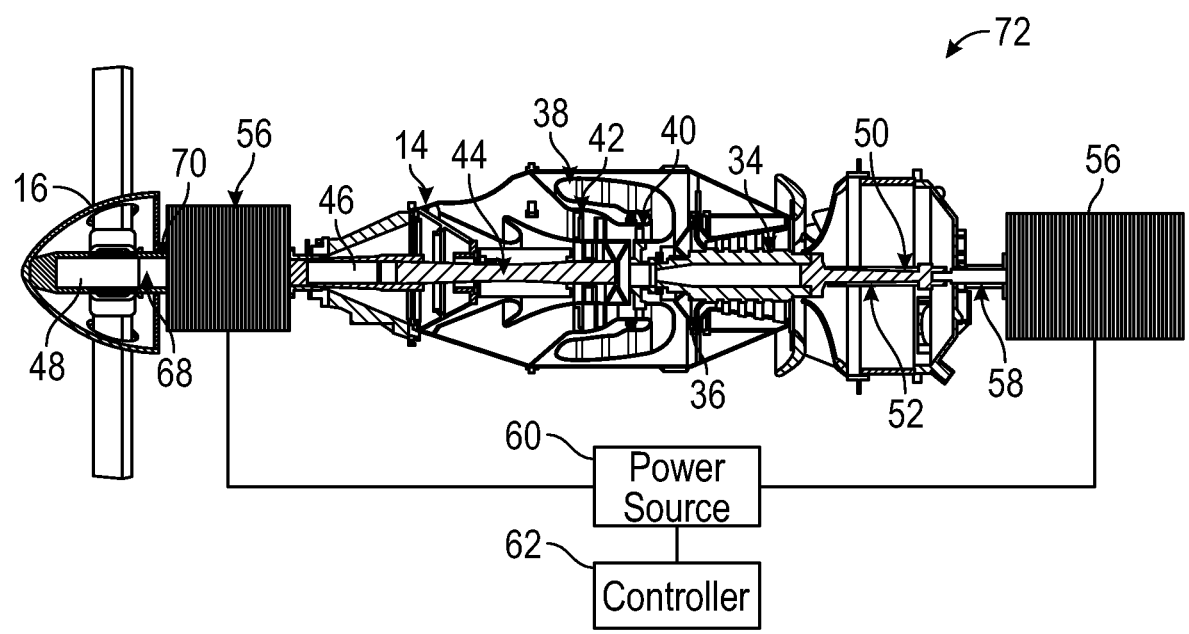
FIG. 10 illustrates a cross-sectional side view of the fifth propulsion system of FIG. 9, in accordance with an embodiment.

FIGS. 9 and 10 represent another technique and system to provide hybridization of the gas turbine engine of FIGS. 1 and 2, specifically propulsion system 72 that includes coupling the electric motor 56 to the propeller assembly 16 as well as the auxiliary gearbox 18. In the manner, the propulsion system 72 combines the electric motor 56 of propulsion system 54 (or propulsion system 64) with the electric motor 56 of propulsion system 66. Thus, the electric motors 56 in the propulsion system of FIGS. 9 and 10 operate generally as described above with respect to propulsion system 54 (or propulsion system 64) and propulsion system 66. With respect to propulsion system 54 and propulsion system 64, there may be reduced thermal power available for the power turbines 42, since the compressor turbine 40 is being powered (at least partially) by the electric motor 56 coupled to the auxiliary gearbox 18, which results in a reduced amount of fuel being consumed in the combustion process of the hot section 24. To maintain sufficient power as being provided to the propeller assembly 16, a second electric motor 56 is mounted between the reduction gearbox 14 and the propeller assembly 16 (as previously described in conjunction with propulsion system 66. It should be noted that each of the electric motors 56 in the propulsion system 72 (i.e., in the compressor section and the propeller section) can be a single electric motor 56 or, for example, a plurality of electric motors 56 (e.g., two or more motors in tandem). Furthermore, each of the electric motors 56 can include, for example, one stator and one or more rotors. Additionally, the electric motor 56 in the compressor section (e.g., the electric motor 56 previously illustrated in conjunction with propulsion system 54 and propulsion system 64) can be connected directly to the motor shaft 58 or can be connected to the motor shaft 58 through a set of gears or via a mechanical coupler, such as a chain, one or more belts, one or more pulleys, and the like.

Given that electric motor placement in the propulsion system 72 are the same as in propulsion system 54 (or propulsion system 64) and propulsion system 66, the mounting points and torque transmission paths will also be the same. The remaining sections of the propulsion system 72 (e.g., the hot section 24, the reduction gearbox 14, the propeller assembly 16, etc.) remain unchanged and function as described above with respect to FIGS. 1 and 2. Furthermore, the benefits described above with respect to propulsion system 54 (or propulsion system 64) and propulsion system 66 regarding the specific placement of the respective electric motors 56 still apply to the propulsion system 72. By utilizing both a front and rear electric motor 56 configuration, increases in the efficiencies of the hybrid operation for the engine with the highest savings in the specific fuel consumption can be achieved.

It should also be noted that FIG. 10 illustrates a single power source 60 for the electric motors 56 as well as a single controller 62. It should be noted that one controller 62 instead may be coupled to and control separate power sources 60 that are each coupled to a respective electric motor. Likewise, in some embodiments, separate controllers 62 may each be coupled to respective (e.g., separate) power sources 60 and each controller 62 may control the power from each power source to its respective electric motor.

Figure 11:
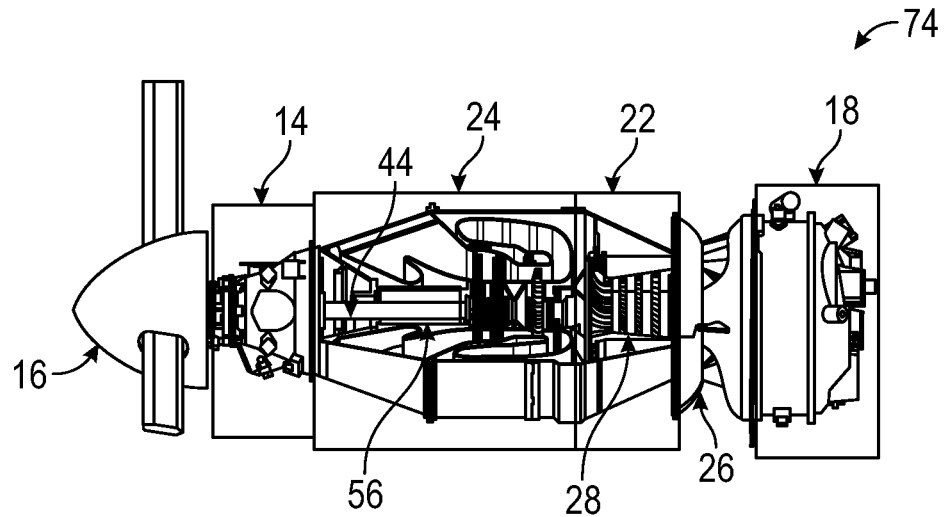
FIG. 11 illustrates a side view of a sixth propulsion system, in accordance with an embodiment.
Figure 12:
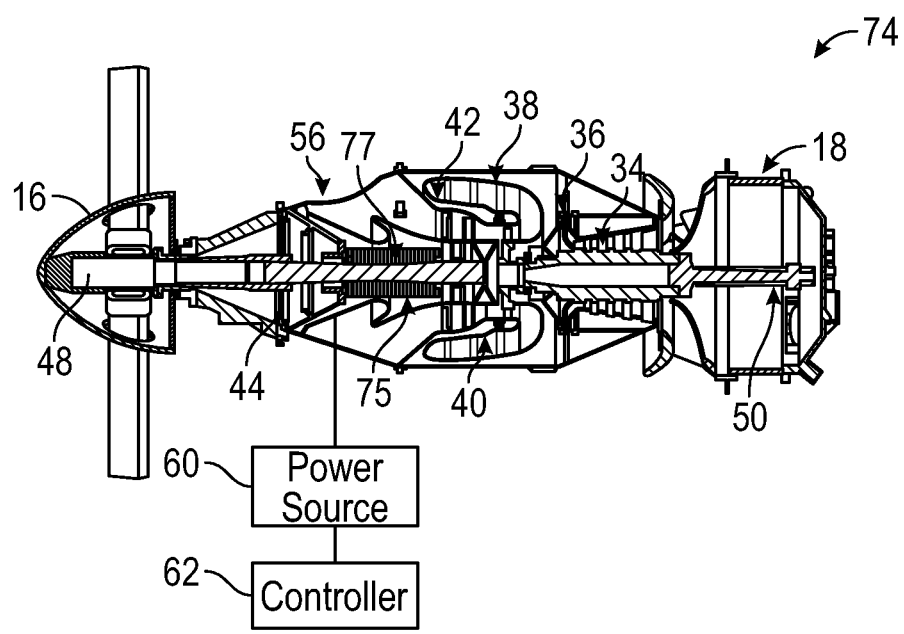
FIG. 12 illustrates a cross-sectional side view of the sixth propulsion system of FIG. 11, in accordance with an embodiment.

FIGS. 11 and 12 represent a further technique and system to provide hybridization of the gas turbine engine of FIGS. 1 and 2, specifically propulsion system 74 that includes coupling the electric motor 56 to the power turbine shaft 44 (e.g., inside of a power turbine shaft housing and disposed between the power turbines 42 and the reduction gearbox 14). It should be noted that the electric motors 56 in the propulsion system 74 can be a single electric motor 56 or, for example, a plurality of electric motors 56 (e.g., two or more motors in tandem). Additionally, the electric motor 56 can be connected directly to power turbine shaft 44 or can be connected to power turbine shaft 44 through a set of gears or via a mechanical coupler, such as a chain, one or more belts, one or more pulleys, and the like.

As illustrated in FIG. 11, and in the cross-sectional side view of the propulsion system 74 that has been sectioned to better illustrate elements therein of FIG. 12, the electric motor 56 is directly coupled to the power turbine shaft 44. In one embodiment, as illustrated in FIG. 12, the electric motor 56 includes a single stator 75 (e.g., formed as a single element and not as two separate stator segments coupled together) that circumferentially surrounds a rotor 77. Furthermore, the electric motor 56 can include, for example, the single stator 75 and one or more rotors 77. The electric motor 56 can be connected directly to the motor shaft 58 or can be connected to the motor shaft 58 through a set of gears or via a mechanical coupler, such as a chain, one or more belts, one or more pulleys, and the like. Torque generated by the electric motor 56 will be directly imparted on the power turbine shaft 44. That torque is transmitted to the reduction gearbox 14 and then to the propeller assembly 16. The power from the power turbine being augmented by the electric motor 56 creates the hybrid effect.

The remaining sections of the propulsion system 74 (e.g., the hot section 24, the reduction gearbox 14, the propeller assembly 16, etc.) remain unchanged and function as described above with respect to FIGS. 1 and 2. Furthermore, this orientation of the electric motor 56 in the propulsion system 74 allows for a reduction in size of the electric motor 56 relative to the electric motors 56 in propulsion systems 54, 64, 66, and 72 at least in part due to the low torque high RPM position and operation of the electric motor of the propulsion system 74. Additionally, the orientation of the electric motor 56 in the propulsion system 74 also avoids the need to change any OEM components with respect to the torque levels output by the electric motor 56. Additionally, integration of the electric motor 56 in the propulsion system 74 may be simplified, since no components related to air pressure or flow generation are being modified. Finally, orientation of the electric motor 56 in the propulsion system 74 allows for less fuel being burned and the lost power is made up using the electric motor 56.

Figure 13:
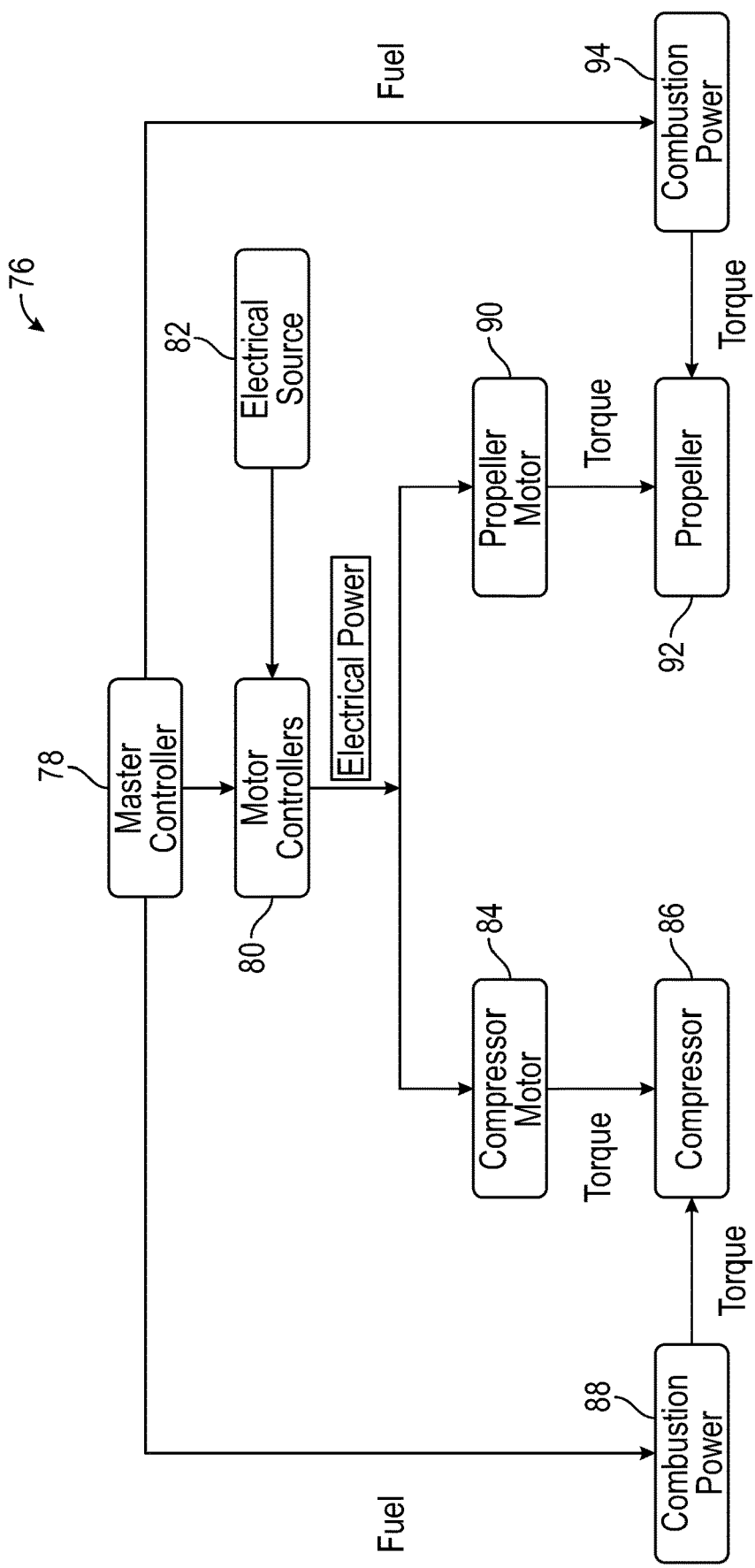
FIG. 13 illustrates a schematic diagram describing control of the any of propulsion systems of FIGS. 1-12, in accordance with an embodiment.

Turning to FIG. 13, a schematic diagram 76 is illustrated. The schematic diagram 76 may represent a control system that is used in conjunction with the propulsion system 72. However, particular branches of the schematic diagram 76 also represent control operations for the propulsion systems 54 and 64 as well as the propulsion systems 66 and 74. Furthermore, while the schematic diagram 76 generally represents the use of a single controller 62, it should be noted that the single controller 62 can control respective power sources 60 or a single power source 60 and/or separate controllers 62 can implement the blocks of the schematic diagram 76.

In block 78, the controller 62 receives readings from compressor turbine 40 (e.g., compressed air pressure, shaft RPM, etc.), readings from the combustion process (e.g., temperature), and readings from the propeller assembly 16 (e.g., shaft torque). These readings may be recorded and/or transmitted from sensors disposed in the propulsion system 72 at locations proximate to the reading locations with operational parameters to be measured. In block 78, the controller 62 processes the input data and in block 80, the controller transmits commands to the fuel injectors for combustion and to the motor controllers for the electric motors 56 to govern their RPMs. The controller 62 may, as illustrated in block 82, control an amount of power transmitted from the power source(s) 60 to the electric motor(s) 56. The electric motor 56 powering elements of the cold section 22 (e.g., the electric motor 56 of the compressors) provides in block 84 a portion of the total necessary shaft work needed by the compressor(s) in block 86. The remainder of the power required for a particular operation is provided by combustion power in block 88, as also controlled by the controller 62 through, for example, an amount of fuel mixed with the compressed air and combusted thereafter.

The controller 62 may, as further illustrated in block 82, control an amount of power transmitted from the power source(s) 60 to the electric motor(s) 56. The electric motor 56 powering the propeller motor between the auxiliary gearbox 18 and the propeller assembly 16 (e.g., the electric motor 56 of the propeller assembly 16) provides in block 90 a portion of the total necessary shaft work needed by the propeller assembly 16 in block 92. The remainder of the power required for a particular operation is provided by combustion power in block 94, as also controlled by the controller 62 through, for example, an amount of fuel mixed with the compressed air and combusted thereafter. Furthermore, one or more of blocks 84, 86, and 88 may be omitted when controlling operations for the propulsion systems 54 and 64 while one or more of blocks 90, 92, and 94 can be omitted when controlling operations for the propulsion systems 66 and 74. Additionally, in some embodiments, it should be noted that the propulsion systems 66 and 74 may operate to provide voltages to the propeller assembly of between approximately 270 volts and 1000 volts, between approximately 270 volts and 800 volts, between approximately 500 volts and 1000 volts, between approximately 500 volts and 800 volts, approximately less than 800 volts, approximately less than 1000 volts, or another value or range.

The techniques and systems provided above illustrate hybridization of the gas turbine engine of FIGS. 1 and 2. However, the hybridization may additionally be applied to additional gas turbine engines, for example, jet engines, such as turbojet or turbofan engines for example. Examples of hybridization of techniques and systems for hybridization of a jet engine are described below.

Figure 14:
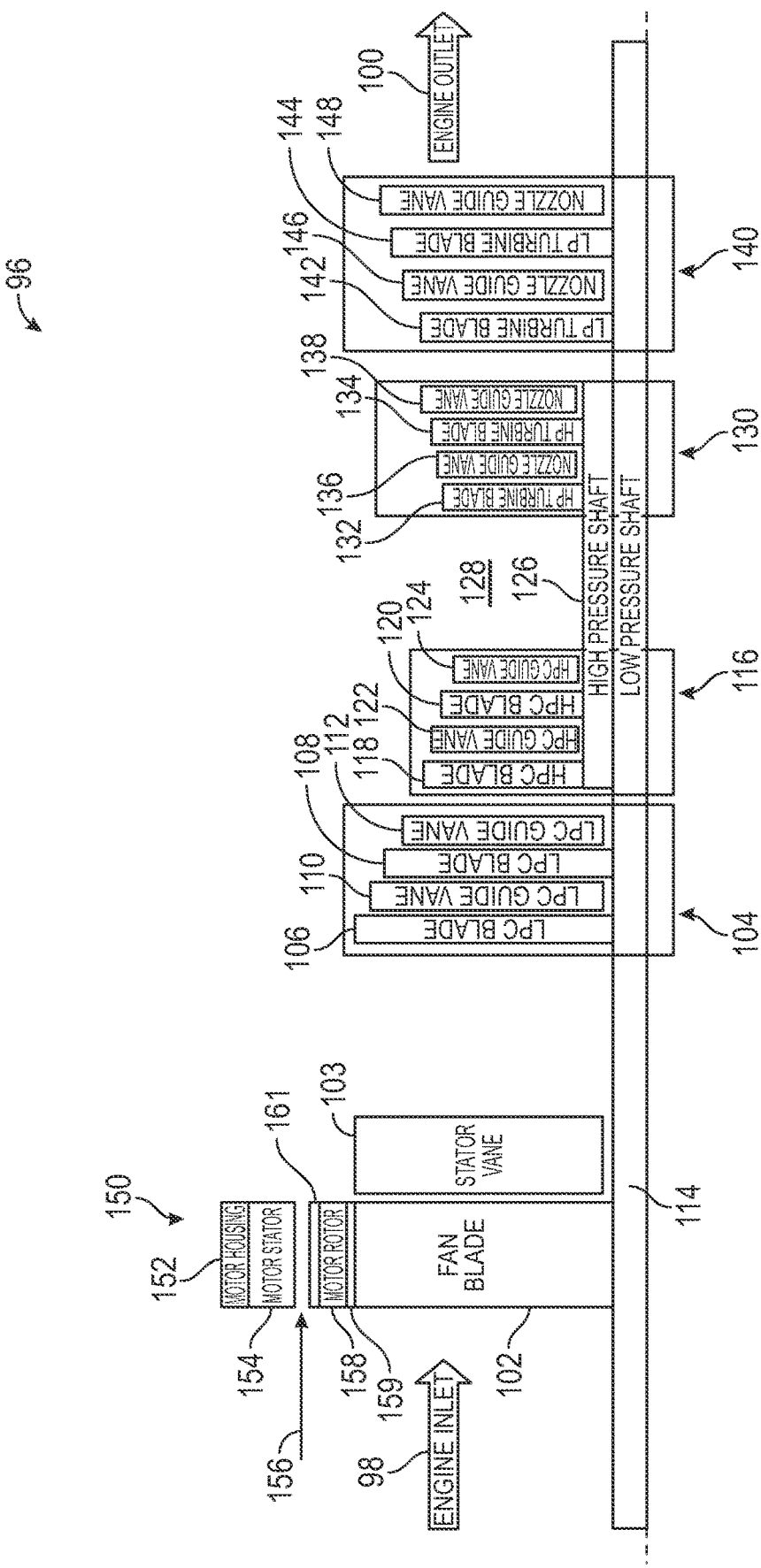
FIG. 14 illustrates a seventh propulsion system, in accordance with an embodiment.

FIG. 14 illustrates a propulsion system 96 that may be used in conjunction with, for example, an aircraft. In some embodiments, the propulsion system 96 is a jet engine for an aircraft that is a gas powered engine. The propulsion system 96 includes an engine inlet 98 and an engine outlet 100 that illustrate a fluid flow path in the propulsion system 96. Air may pass through a fan stage 102 and may flow towards a low pressure compressor stage 104 of the propulsion system 96. In operation, the fan stage 102 has rotating fan blades that operate to draw and/or direct air into the propulsion system 96 and pass it downstream to the low pressure compressor stage 104. Additionally, in some embodiments, a guide vane 103 may be disposed downstream of and adjacent to the fan stage 102. The guide vane 103 operates to guide or otherwise channel air that has passed through the respective fan stage 102 downstream to, for example, the low pressure compressor stage 104.

The low pressure compressor stage 104 may operate to initially compress air received from the fan stage 102. The low pressure compressor stage 104 can include, for example, a fan stage 106 and a fan stage 108, each having rotating fan blades that operate to compress the received air as it passes therethrough. Fan stage 106 and the fan stage 108 thus represent a series of fans, each containing rotating fan blades that each operate to compress air it has received as it passes through each of the fan stage 106 and the fan stage 108 (e.g., through each stage of compression). Additionally present in the low pressure compressor stage 104 are illustrated guide vane 110 and guide vane 112 that correspond to each of fan stage 106 and fan stage 108, respectively. The guide vane 110 and the guide vane 112 each operate to guide or otherwise channel air that has passed through the respective fan stage 106 and fan stage 108. As illustrated, the fan stage 106 and the fan stage 108 are directly connected to a common shaft, the low pressure shaft 114, which operates to impart rotation to the fan stage 106 and the fan stage 108. As additionally illustrated, the low pressure shaft 114 can be additionally coupled to the fan stage 102.

Subsequent to (e.g., downstream from) the low pressure compressor stage 104 is a high pressure compressor stage 116. The high pressure compressor stage 116 may operate to additionally compress the low pressure compressed air received from the low pressure compressor stage 104 to an increased (higher) pressure level. The high pressure compressor stage 116 can include, for example, a fan stage 118 and a fan stage 120, each having rotating fan blades that operate to compress the received air as it passes therethrough. Fan stage 118 and the fan stage 120 thus represent a series of fans (similar to fan stage 106 and fan stage 108), each containing rotating fan blades that each operate to compress air it has received as it passes through each of the fan stage 106 and the fan stage 108 (e.g., through each stage of compression). Additionally present in the high pressure compressor stage 116 are illustrated guide vane 122 and guide vane 124 that correspond to each of fan stage 118 and fan stage 120, respectively. The guide vane 122 and the guide vane 124 each operate to guide or otherwise channel air that has passed through the respective fan stage 118 and fan stage 120. As illustrated, the fan stage 118 and the fan stage 120 are directly connected to a common shaft, the high pressure shaft 126, which operates to impart rotation to the fan stage 118 and the fan stage 120. In some embodiments, the high pressure shaft 126 rotates more rapidly than the low pressure shaft 114 which, for example, allows for the high pressure compressor stage 116 to compress received air to a higher pressure than possible by the low pressure compressor stage 104 driven by the low pressure shaft 114.

The propulsion system 96 additionally includes a combustion section 128 that receives the compressed air from the high pressure compressor stage 116, mixes the compressed air with fuel, and ignites the mixture to generate a combustion gas utilizing a combustor. This combustion gas can be utilized to power multiple turbines downstream of the combustion section 128 and passes as exhaust out of the engine outlet 100.

As illustrated, downstream of the combustion section 128 is a high pressure turbine stage 130. The high pressure turbine stage 130 may operate to impart rotation to the high pressure shaft 126. The high pressure turbine stage 130 can include, for example, a turbine stage 132 and a turbine stage 134, each having rotating fan blades that operate to receive energy as the combustion gas passes through each of the turbine stage 132 and the turbine stage 134 (e.g., through each turbine stage). Additionally present in the high pressure turbine stage 130 are illustrated guide vane 136 and guide vane 138 that correspond to each of turbine stage 132 and turbine stage 134, respectively. The guide vane 136 and the guide vane 138 each operate to guide or otherwise channel combustion gas that has passed through the respective turbine stage 132 and turbine stage 134. As illustrated, the turbine stage 132 and the turbine stage 134 are directly connected to a common shaft, the high pressure shaft 126, and the turbine stage 132 and the turbine stage 134 operate to impart rotation to the high pressure shaft 126.

The combustion gas may exit the high pressure turbine stage 130 and may flow to the low pressure turbine stage 140. The low pressure turbine stage 140 may operate to impart rotation to the low pressure shaft 114. The low pressure turbine stage 140 can include, for example, a turbine stage 142 and a turbine stage 144, each having rotating fan blades that operate to receive energy as the combustion gas passes through each of the turbine stage 142 and the turbine stage 144 (e.g., through each turbine stage). Additionally present in the low pressure turbine stage 140 are illustrated guide vane 146 and guide vane 148 that correspond to each of turbine stage 142 and turbine stage 144, respectively. The guide vane 146 and the guide vane 148 each operate to guide or otherwise channel combustion gas that has passed through the respective turbine stage 142 and turbine stage 144. As illustrated, the turbine stage 142 and the turbine stage 144 are directly connected to a common shaft, the low pressure shaft 114, and the turbine stage 142 and the turbine stage 144 operate to impart rotation to the low pressure shaft 114 at a rotation speed lower than the rotation speed imparted to the high pressure shaft 126 due to, for example, lesser energy being present in the combustion gas (due to the reduced temperature of the combustion gas) when in the low pressure turbine stage 140 relative to the high pressure turbine stage 130.

As noted above, present embodiments include techniques for hybridization of the propulsion system 96. For example, the propulsion system 96 can include an electric motor 150 that operates in conjunction with the above described elements of the propulsion system 96. For example, the electric motor 150 can be a front fan integrated motor that is disposed adjacent to the fan stage 102. As illustrated, the electric motor 150 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 102. Alternatively, the motor stator 154 and motor rotor 158 may be operated as an electric generator. For example, during a descent or landing of an aircraft, the motor stator 154 may be operated to generate resistance to the rotation of fan stage 102. This may result in reduced net thrust provided by propulsion system 96, leading to a reduction in the aircraft's speed. This may also result in the generation of electrical power, which may be used e.g., to charge one or more power sources (e.g., electrochemical batteries) on board the aircraft.

In some embodiments, the fan stage 102 is integrated fan blade whereby the motor rotor 158 has its rotor magnet(s) positioned about a fan shroud encircling the fan stage, which may be held in position (in some embodiments), via a compressive sleeve. Thus, the electric motor 150 provides torque directly to the integrated fan blade through the motor rotor 158, thus allowing for hybrid and/or full electric operation. That is, the electric motor 150 can supplement rotation provided by the low pressure shaft 114 in a hybrid mode or the low pressure shaft 114 can be disengaged from the fan stage 102 and the electric motor 150 can solely provide rotation to the fan blade of the fan stage 102 in an electric mode.

Likewise, the electric motor 150 can provide full power used by the propulsion system 96 generate any given thrust by transferring torque to the low pressure shaft 114 through the fan stage (e.g., rotor integrated fan blades, as provided as a described example above). The electric motor 150 can also provide a partial power required to generate any given thrust while the rest of the power comes from the combustion generated in the combustion section 128. In other embodiments, the electric motor 150 can also operate as a generator by capturing power from the low pressure shaft 114 through fan stage 102 (e.g., through rotor integrated fan blades). Likewise, through a combination of motoring/generating operations (similar to that outlined with respect to FIG. 13), the electric motor 150 can increase the overall operational efficiency of the engine (e.g., the propulsion system 96).

Figure 15:
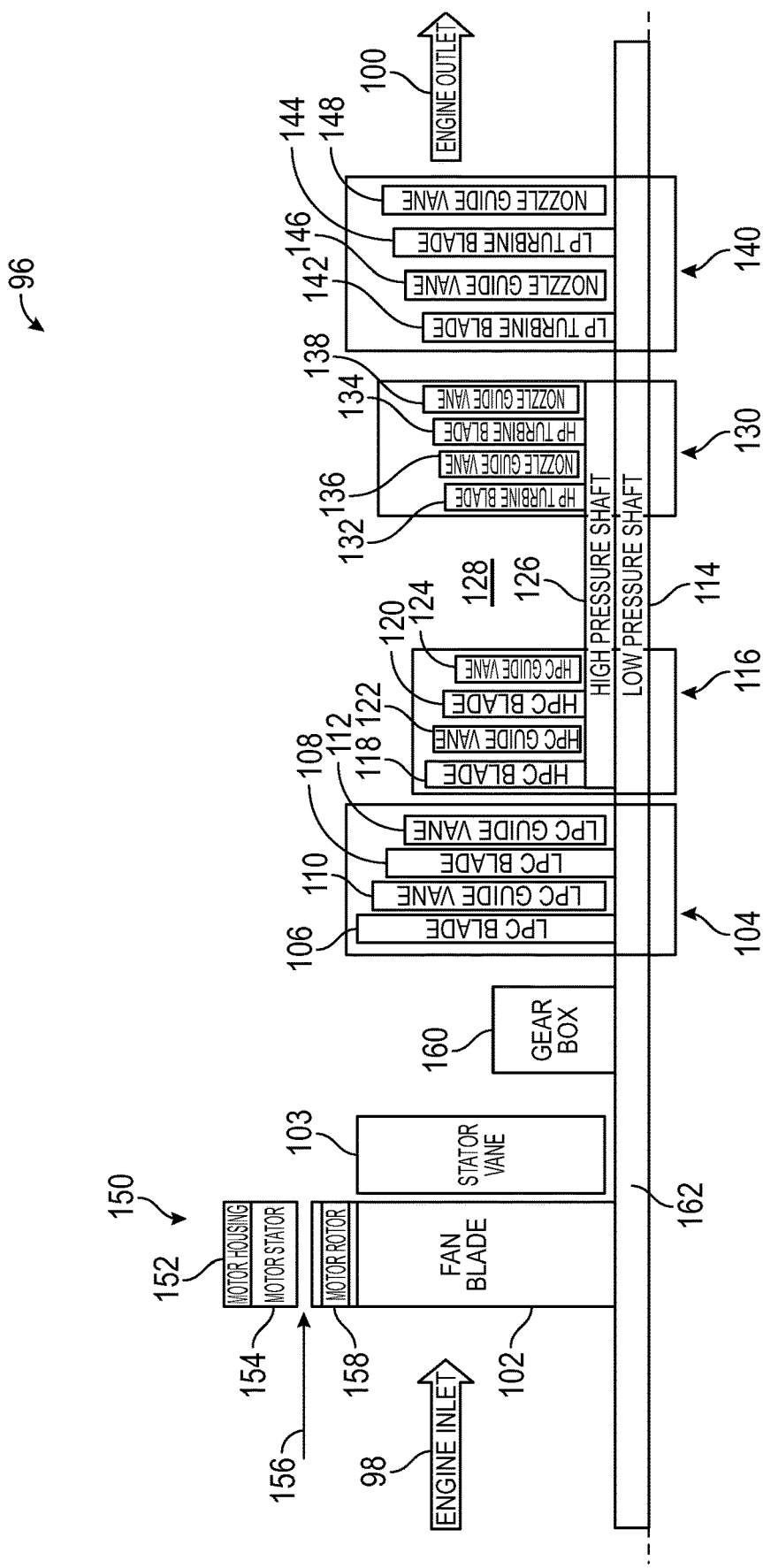
FIG. 15 illustrates a second embodiment of the seventh propulsion system of FIG. 14, in accordance with an embodiment.

FIG. 15 illustrates a second embodiment of propulsion system 96 that may be used in conjunction with, for example, an aircraft. In addition to the elements described above with respect to FIG. 14, the second embodiment of propulsion system 96 additionally includes a reduction gearbox 160 as well as a drive shaft 162. In operation, the low pressure shaft 114 is coupled to the reduction gearbox 160, which may operate to transmit rotation from the low pressure shaft 114 to the drive shaft 162 coupled to the fan stage 102. The reduction gearbox 160 may operate as a gearing mechanism that alters the rotation speed between the low pressure shaft 114 and the drive shaft 162. Additionally, by separating the low pressure shaft 114 and the drive shaft 162, the electric motor 150 may impart rotation to the fan stage 102 (when acting as an electric motor) or remove energy from the fan stage 102 (when acting as an electric generator) without affecting the operation of the low pressure shaft 114.

Figure 16:
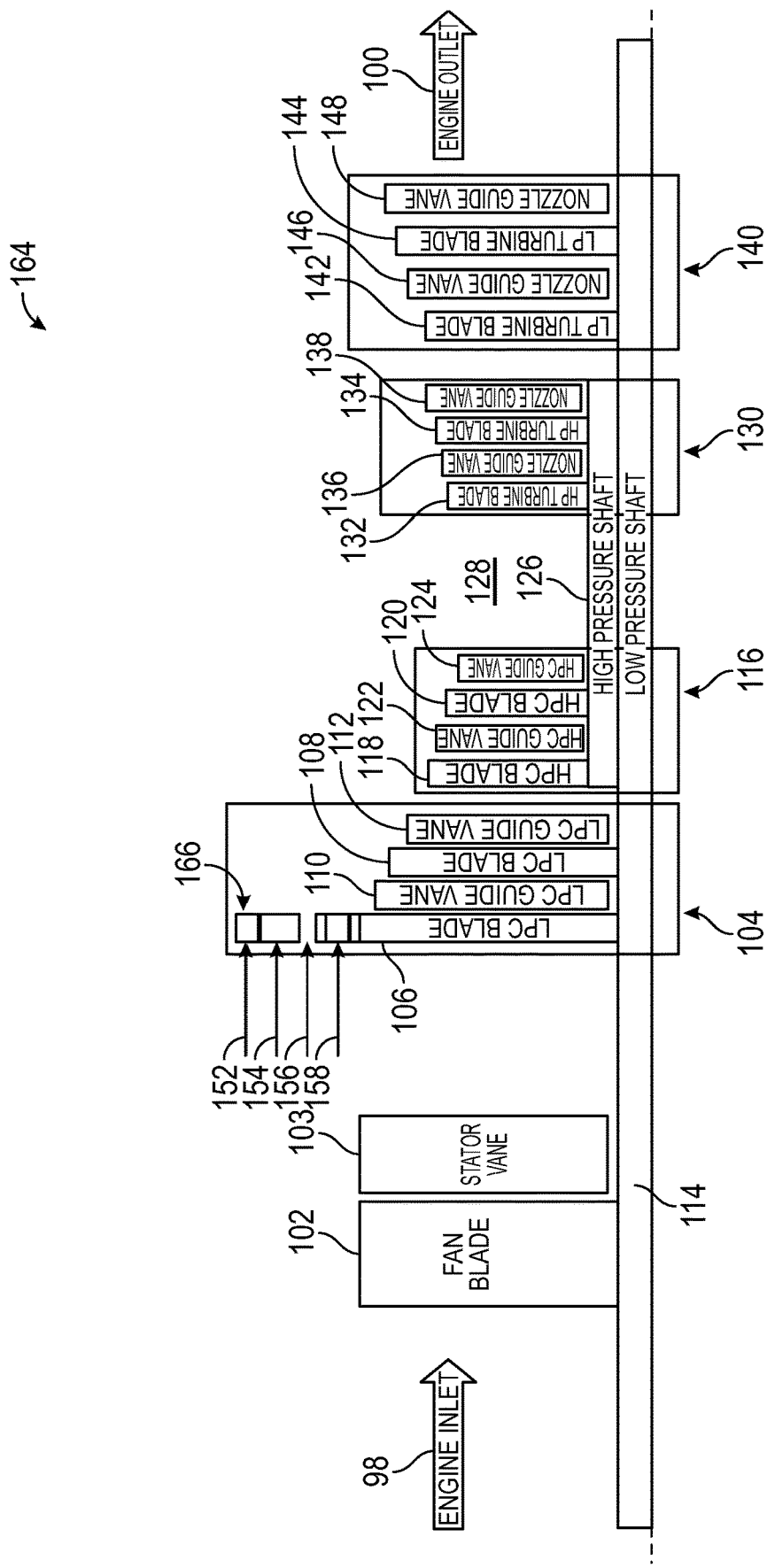
FIG. 16 illustrates an eighth propulsion system, in accordance with an embodiment.

FIG. 16 illustrates a propulsion system 164 that may be used in conjunction with, for example, an aircraft. In some embodiments, the propulsion system 164 is a jet engine for an aircraft that is a gas powered engine. The propulsion system 164 includes an engine inlet 98 and an engine outlet 100 that illustrate a fluid flow path in the propulsion system 164. Air may pass through a fan stage 102 and may flow towards a low pressure compressor stage 104 of the propulsion system 164. In operation, the fan stage 102 has rotating fan blades that operate to draw and/or direct air into the propulsion system 164 and pass it downstream to the low pressure compressor stage 104. Additionally, in some embodiments, a guide vane 103 may be disposed downstream of and adjacent to the fan stage 102. The guide vane 103 operates to guide or otherwise channel air that has passed through the respective fan stage 102 downstream to, for example, the low pressure compressor stage 104.

The low pressure compressor stage 104 may operate to initially compress air received from the fan stage 102. The low pressure compressor stage 104 can include, for example, a fan stage 106 and a fan stage 108, each having rotating fan blades that operate to compress the received air as it passes therethrough. Fan stage 106 and the fan stage 108 thus represent a series of fans, each containing rotating fan blades that each operate to compress air it has received as it passes through each of the fan stage 106 and the fan stage 108 (e.g., through each stage of compression). Additionally present in the low pressure compressor stage 104 are illustrated guide vane 110 and guide vane 112 that correspond to each of fan stage 106 and fan stage 108, respectively. The guide vane 110 and the guide vane 112 each operate to guide or otherwise channel air that has passed through the respective fan stage 106 and fan stage 108. As illustrated, the fan stage 106 and the fan stage 108 are directly connected to a common shaft, the low pressure shaft 114, which operates to impart rotation to the fan stage 106 and the fan stage 108. As additionally illustrated, the low pressure shaft 114 can be additionally coupled to the fan stage 102.

Subsequent to (e.g., downstream from) the low pressure compressor stage 104 is a high pressure compressor stage 116. The high pressure compressor stage 116 may operate to additionally compress the low pressure compressed air received from the low pressure compressor stage 104 to an increased (higher) pressure level. The high pressure compressor stage 116 can include, for example, a fan stage 118 and a fan stage 120, each having rotating fan blades that operate to compress the received air as it passes therethrough. Fan stage 118 and the fan stage 120 thus represent a series of fans (similar to fan stage 106 and fan stage 108), each containing rotating fan blades that each operate to compress air it has received as it passes through each of the fan stage 118 and the fan stage 120 (e.g., through each stage of compression). Additionally present in the high pressure compressor stage 116 are illustrated guide vane 122 and guide vane 124 that correspond to each of fan stage 118 and fan stage 120, respectively. The guide vane 122 and the guide vane 124 each operate to guide or otherwise channel air that has passed through the respective fan stage 118 and fan stage 120. As illustrated, the fan stage 118 and the fan stage 120 are directly connected to a common shaft, the high pressure shaft 126, which operates to impart rotation to the fan stage 118 and the fan stage 120. In some embodiments, the high pressure shaft 126 rotates more rapidly than the low pressure shaft 114 which, for example, allows for the high pressure compressor stage 116 to compress received air to a higher pressure than possible by the low pressure compressor stage 104 driven by the low pressure shaft 114.

The propulsion system 96 additionally includes a combustion section 128 that receives the compressed air from the high pressure compressor stage 116, mixes the compressed air with fuel, and ignites the mixture to generate a combustion gas utilizing a combustor. This combustion gas can be utilized to power multiple turbines downstream of the combustion section 128 and passes as exhaust out of the engine outlet 100.

As illustrated, downstream of the combustion section 128 is a high pressure turbine stage 130. The high pressure turbine stage 130 may operate to impart rotation to the high pressure shaft 126. The high pressure turbine stage 130 can include, for example, a turbine stage 132 and a turbine stage 134, each having rotating fan blades that operate to receive energy as the combustion gas passes through each of the turbine stage 132 and the turbine stage 134 (e.g., through each turbine stage). Additionally present in the high pressure turbine stage 130 are illustrated guide vane 136 and guide vane 138 that correspond to each of turbine stage 132 and turbine stage 134, respectively. The guide vane 136 and the guide vane 138 each operate to guide or otherwise channel combustion gas that has passed through the respective turbine stage 132 and turbine stage 134. As illustrated, the turbine stage 132 and the turbine stage 134 are directly connected to a common shaft, the high pressure shaft 126, and the turbine stage 132 and the turbine stage 134 operate to impart rotation to the high pressure shaft 126.

The combustion gas may exit the high pressure turbine stage 130 and may flow to the low pressure turbine stage 140. The low pressure turbine stage 140 may operate to impart rotation to the low pressure shaft 114. The low pressure turbine stage 140 can include, for example, a turbine stage 142 and a turbine stage 144, each having rotating fan blades that operate to receive energy as the combustion gas passes through each of the turbine stage 142 and the turbine stage 144 (e.g., through each turbine stage). Additionally present in the low pressure turbine stage 140 are illustrated guide vane 146 and guide vane 148 that correspond to each of turbine stage 142 and turbine stage 144, respectively. The guide vane 146 and the guide vane 148 each operate to guide or otherwise channel combustion gas that has passed through the respective turbine stage 142 and turbine stage 144. As illustrated, the turbine stage 142 and the turbine stage 144 are directly connected to a common shaft, the low pressure shaft 114, and the turbine stage 142 and the turbine stage 144 operate to impart rotation to the low pressure shaft 114 at a rotation speed lower than the rotation speed imparted to the high pressure shaft 126 due to, for example, lesser energy being present in the combustion gas (due to the reduced temperature of the combustion gas) when in the low pressure turbine stage 140 relative to the high pressure turbine stage 130.

As noted above, present embodiments include techniques for hybridization of the propulsion system 164. For example, the propulsion system 164 can include an electric motor 166 that operates in conjunction with the above described elements of the propulsion system 164. For example, the electric motor 166 can be a front fan integrated motor that is disposed adjacent to the fan stage 106. As illustrated, the electric motor 166 includes a motor housing 152 that surrounds a motor stator 154. An airgap 156 may be provided adjacent to the motor stator 154 to provide cooling fluid (e.g., air) and a motor rotor 158 may also be included in the electric motor 166.

In operation, the motor stator 154 may include windings while the motor rotor 158 includes one or more magnets. The motor stator 154 and motor rotor 158 may be operated as an electric motor, where electrical power is applied to rotate fan blades of the fan stage 106. Alternatively, the motor stator 154 and motor rotor 158 may be operated as an electric generator. For example, during a descent or landing of an aircraft, the motor stator 154 may be operated to generate resistance to the rotation of fan stage 106. This may result in reduced net thrust provided by propulsion system 164, leading to a reduction in the aircraft's speed. This may also result in the generation of electrical power, which may be used e.g., to charge one or more power sources (e.g., electrochemical batteries) on board the aircraft.

In some embodiments, the fan stage 106 is integrated fan blade whereby the motor rotor 158 has its rotor magnet(s) positioned about a fan shroud encircling the fan stage 102, which may be held in position (in some embodiments), via a compressive sleeve. Thus, the electric motor 166 provides torque directly to the integrated fan blade through the motor rotor 158, thereby allowing for hybrid and/or full electric operation. That is, the electric motor 166 can supplement rotation provided by the low pressure shaft 114 in a hybrid mode or the low pressure shaft 114 can be disengaged from the fan stage 102 and the electric motor 166 can solely provide rotation to the fan blade of the fan stage 102 in an electric mode.

Likewise, the electric motor 166 can provide full power used by the propulsion system 96 generate any given thrust by transferring torque to the low pressure shaft 114 through the fan stage 106 (e.g., rotor integrated fan blades, as provided as a described example above). The electric motor 166 can also provide a partial power required to generate any given thrust while the rest of the power comes from the combustion generated in the combustion section 128. In other embodiments, the electric motor 166 can also operate as a generator by capturing power from the low pressure shaft 114 through fan stage 102 (e.g., through rotor integrated fan blades). Likewise, through a combination of motoring/generating operations (similar to that outlined with respect to FIG. 13), the electric motor 166 can increase the overall operational efficiency of the engine (e.g., the propulsion system 164).

Figure 17:
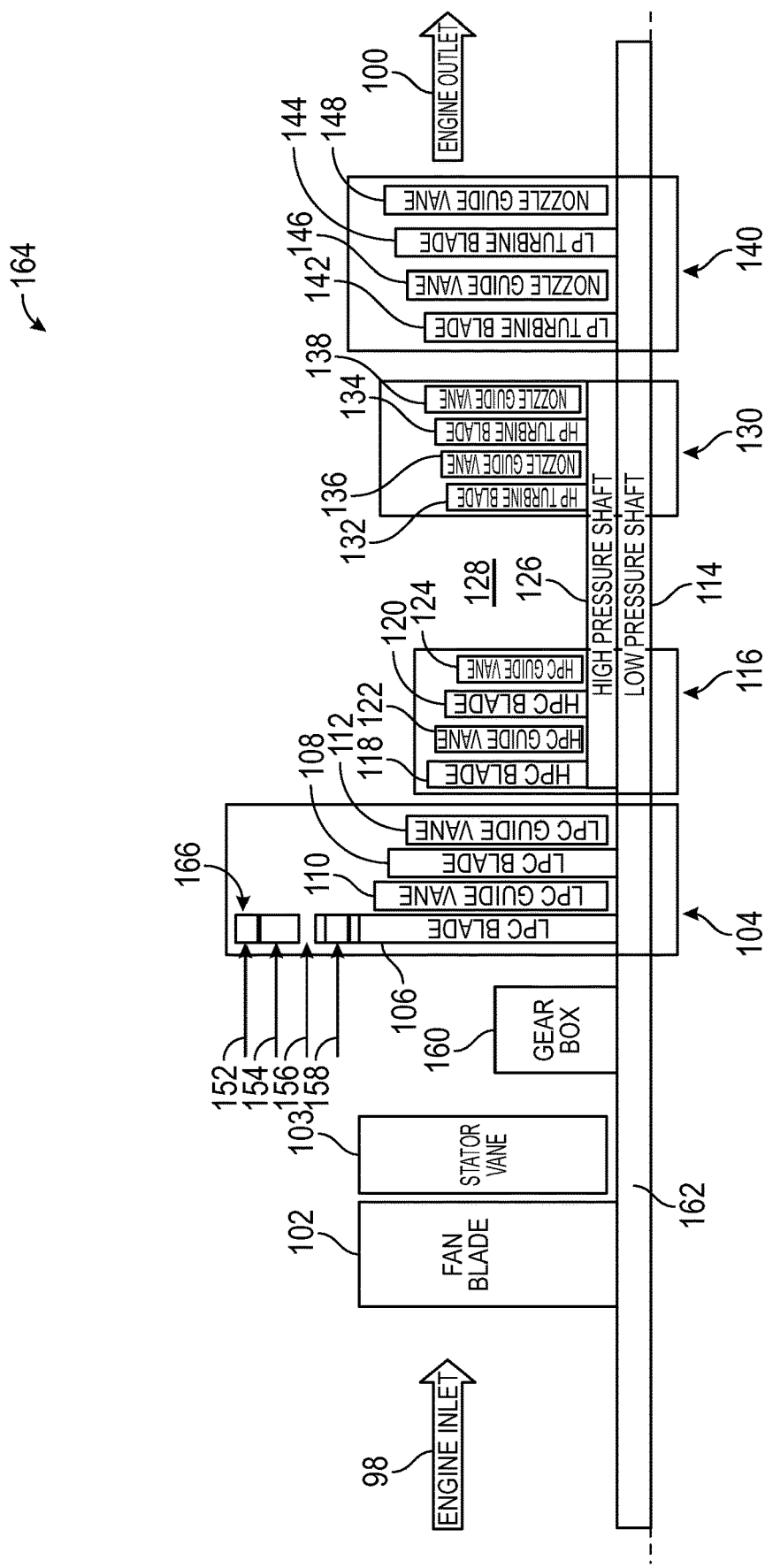
FIG. 17 illustrates a second embodiment of the eighth propulsion system of FIG. 16, in accordance with an embodiment.

FIG. 17 illustrates a second embodiment of propulsion system 164 that may be used in conjunction with, for example, an aircraft. In addition to the elements described above with respect to FIG. 16, the second embodiment of propulsion system 164 additionally includes a reduction gearbox 160 as well as a drive shaft 162. In operation, the low pressure shaft 114 is coupled to the reduction gearbox 160, which may operate to transmit rotation from the low pressure shaft 114 to the drive shaft 162 coupled to the fan stage 102. The reduction gearbox 160 may operate as a gearing mechanism that alters the rotation speed between the low pressure shaft 114 and the drive shaft 162.

Figure 18:
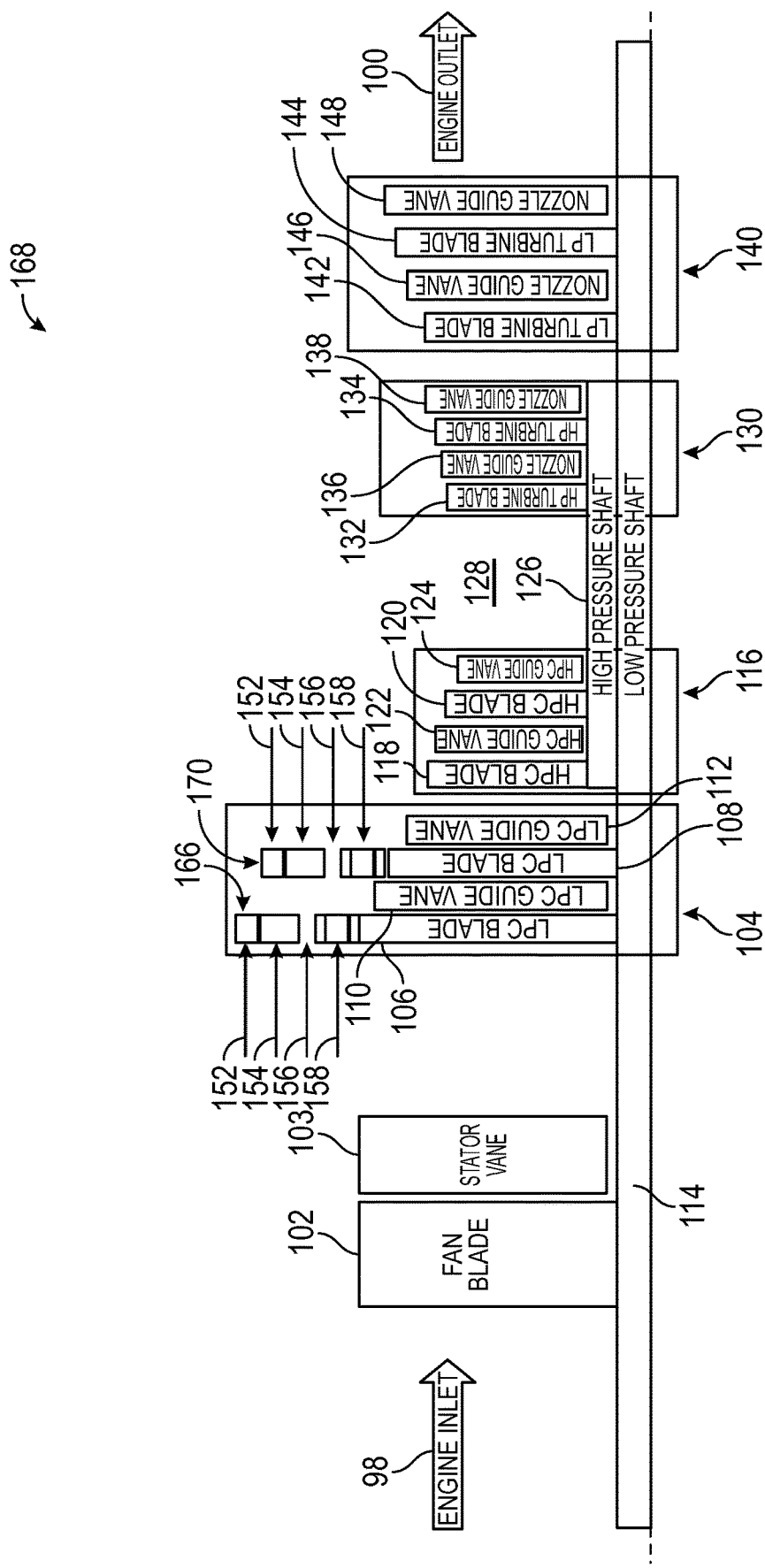
FIG. 18 illustrates an ninth propulsion system, in accordance with an embodiment.

FIG. 18 illustrates a propulsion system 168 that may be used in conjunction with, for example, an aircraft. In some embodiments, the propulsion system 168 is a jet engine for an aircraft that is a gas powered engine. The propulsion system 168 includes an engine inlet 98 and an engine outlet 100 that illustrate a fluid flow path in the propulsion system 168. Air may pass through a fan stage 102 and may flow towards a low pressure compressor stage 104 of the propulsion system 168. In operation, the fan stage 102 has rotating fan blades that operate to draw and/or direct air into the propulsion system 168 and pass it downstream to the low pressure compressor stage 104. Additionally, in some embodiments, a guide vane 103 may be disposed downstream of and adjacent to the fan stage 102. The guide vane 103 operates to guide or otherwise channel air that has passed through the respective fan stage 102 downstream to, for example, the low pressure compressor stage 104.

The low pressure compressor stage 104 may operate to initially compress air received from the fan stage 102. The low pressure compressor stage 104 can include, for example, a fan stage 106 and a fan stage 108, each having rotating fan blades that operate to compress the received air as it passes therethrough. Fan stage 106 and the fan stage 108 thus represent a series of fans, each containing rotating fan blades that each operate to compress air it has received as it passes through each of the fan stage 106 and the fan stage 108 (e.g., through each stage of compression). Additionally present in the low pressure compressor stage 104 are illustrated guide vane 110 and guide vane 112 that correspond to each of fan stage 106 and fan stage 108, respectively. The guide vane 110 and the guide vane 112 each operate to guide or otherwise channel air that has passed through the respective fan stage 106 and fan stage 108. As illustrated, the fan stage 106 and the fan stage 108 are directly connected to a common shaft, the low pressure shaft 114, which operates to impart rotation to the fan stage 106 and the fan stage 108. As additionally illustrated, the low pressure shaft 114 can be additionally coupled to the fan stage 102.

Subsequent to (e.g., downstream from) the low pressure compressor stage 104 is a high pressure compressor stage 116. The high pressure compressor stage 116 may operate to additionally compress the low pressure compressed air received from the low pressure compressor stage 104 to an increased (higher) pressure level. The high pressure compressor stage 116 can include, for example, a fan stage 118 and a fan stage 120, each having rotating fan blades that operate to compress the received air as it passes therethrough. Fan stage 118 and the fan stage 120 thus represent a series of fans (similar to fan stage 106 and fan stage 108), each containing rotating fan blades that each operate to compress air it has received as it passes through each of the fan stage 118 and the fan stage 120 (e.g., through each stage of compression). Additionally present in the high pressure compressor stage 116 are illustrated guide vane 122 and guide vane 124 that correspond to each of fan stage 118 and fan stage 120, respectively. The guide vane 122 and the guide vane 124 each operate to guide or otherwise channel air that has passed through the respective fan stage 118 and fan stage 120. As illustrated, the fan stage 118 and the fan stage 120 are directly connected to a common shaft, the high pressure shaft 126, which operates to impart rotation to the fan stage 118 and the fan stage 120. In some embodiments, the high pressure shaft 126 rotates more rapidly than the low pressure shaft 114 which, for example, allows for the high pressure compressor stage 116 to compress received air to a higher pressure than possible by the low pressure compressor stage 104 driven by the low pressure shaft 114.

The propulsion system 168 additionally includes a combustion section 128 that receives the compressed air from the high pressure compressor stage 116, mixes the compressed air with fuel, and ignites the mixture to generate a combustion gas utilizing a combustor. This combustion gas can be utilized to power multiple turbines downstream of the combustion section 128 and passes as exhaust out of the engine outlet 100.

As illustrated, downstream of the combustion section 128 is a high pressure turbine stage 130. The high pressure turbine stage 130 may operate to impart rotation to the high pressure shaft 126. The high pressure turbine stage 130 can include, for example, a turbine stage 132 and a turbine stage 134, each having rotating fan blades that operate to receive energy as the combustion gas passes through each of the turbine stage 132 and the turbine stage 134 (e.g., through each turbine stage). Additionally present in the high pressure turbine stage 130 are illustrated guide vane 136 and guide vane 138 that correspond to each of turbine stage 132 and turbine stage 134, respectively. The guide vane 136 and the guide vane 138 each operate to guide or otherwise channel combustion gas that has passed through the respective turbine stage 132 and turbine stage 134. As illustrated, the turbine stage 132 and the turbine stage 134 are directly connected to a common shaft, the high pressure shaft 126, and the turbine stage 132 and the turbine stage 134 operate to impart rotation to the high pressure shaft 126.

The combustion gas may exit the high pressure turbine stage 130 and may flow to the low pressure turbine stage 140. The low pressure turbine stage 140 may operate to impart rotation to the low pressure shaft 114. The low pressure turbine stage 140 can include, for example, a turbine stage 142 and a turbine stage 144, each having rotating fan blades that operate to receive energy as the combustion gas passes through each of the turbine stage 142 and the turbine stage 144 (e.g., through each turbine stage). Additionally present in the low pressure turbine stage 140 are illustrated guide vane 146 and guide vane 148 that correspond to each of turbine stage 142 and turbine stage 144, respectively. The guide vane 146 and the guide vane 148 each operate to guide or otherwise channel combustion gas that has passed through the respective turbine stage 142 and turbine stage 144. As illustrated, the turbine stage 142 and the turbine stage 144 are directly connected to a common shaft, the low pressure shaft 114, and the turbine stage 142 and the turbine stage 144 operate to impart rotation to the low pressure shaft 114 at a rotation speed lower than the rotation speed imparted to the high pressure shaft 126 due to, for example, lesser energy being present in the combustion gas (due to the reduced temperature of the combustion gas) when in the low pressure turbine stage 140 relative to the high pressure turbine stage 130.

As noted above, present embodiments include techniques for hybridization of the propulsion system 168. For example, the propulsion system 168 can include an electric motor 166 that operates in conjunction with the above described elements of the propulsion system 168. In some embodiments, electric motor 166 can be similar to electric motor 150. Additionally, for example, the electric motor 166 can be a low pressure compressor blade integrated motor that is disposed adjacent to the low pressure compressor stage 104. More particularly, the electric motor 166 can be coupled to the fan stage 106 or, for example, a blade or fan therein. As illustrated, the electric motor 166 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 106. Alternatively, the motor stator 154 and motor rotor 158 may be operated as an electric generator. For example, during a descent or landing of an aircraft, the motor stator 154 may be operated to generate resistance to the rotation of fan stage 106. This may result in reduced net thrust provided by propulsion system 168, leading to a reduction in the aircraft's speed. This may also result in the generation of electrical power, which may be used e.g., to charge one or more power sources (e.g., electrochemical batteries) on board the aircraft.

In some embodiments, the fan stage 106 is integrated fan blade whereby the motor rotor 158 has its rotor magnet(s) positioned about a fan shroud encircling the fan stage 106, which may be held in position (in some embodiments), via a compressive sleeve. Thus, the electric motor 166 provides torque directly to the integrated fan blade through the motor rotor 158, thereby allowing for hybrid and/or full electric operation. That is, the electric motor 166 can supplement rotation provided by the low pressure shaft 114 in a hybrid mode or the low pressure shaft 114 can be disengaged from the fan stage 106 and the electric motor 166 can solely provide rotation to the fan blade of the fan stage 106 in an electric mode.

Likewise, the electric motor 166 can provide full power used by the propulsion system 168 generate any given thrust by transferring torque to the low pressure shaft 114 through the fan stage 106 (e.g., rotor integrated fan blades, as provided as a described example above). The electric motor 166 can also provide a partial power required to generate any given thrust while the rest of the power comes from the combustion generated in the combustion section 128. In other embodiments, the electric motor 166 can also operate as a generator by capturing power from the low pressure shaft 114 through fan stage 106 (e.g., through rotor integrated fan blades). Likewise, through a combination of motoring/generating operations (similar to that outlined with respect to FIG. 13), the electric motor 166 can increase the overall operational efficiency of the engine (e.g., the propulsion system 168).

Additionally, the propulsion system 168 can include an additional electric motor 170 that operates in conjunction with the above described elements of the propulsion system 168. In some embodiments, electric motor 170 can be similar to electric motor 150 or electric motor 166. For example, the electric motor 170 can be a low pressure compressor blade integrated motor that is disposed adjacent to the low pressure compressor stage 104. More particularly, the electric motor 170 can be coupled to the fan stage 108 or, for example, a blade or fan therein. As illustrated, the electric motor 170 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 108. Alternatively, the motor stator 154 and motor rotor 158 may be operated as an electric generator. For example, during a descent or landing of an aircraft, the motor stator 154 may be operated to generate resistance to the rotation of fan stage 108. This may result in reduced net thrust provided by propulsion system 168, leading to a reduction in the aircraft's speed. This may also result in the generation of electrical power, which may be used e.g., to charge one or more power sources (e.g., electrochemical batteries) on board the aircraft.

In some embodiments, the fan stage 108 is integrated fan blade whereby the motor rotor 158 has its rotor magnet(s) positioned about a fan shroud encircling the fan stage 108, which may be held in position (in some embodiments), via a compressive sleeve. Thus, the electric motor 170 provides torque directly to the integrated fan blade through the motor rotor 158, thereby allowing for hybrid and/or full electric operation. That is, the electric motor 170 can supplement rotation provided by the low pressure shaft 114 in a hybrid mode or the low pressure shaft 114 can be disengaged from the fan stage 108 and the electric motor 170 can solely provide rotation to the fan blade of the fan stage 108 in an electric mode.

Likewise, the electric motor 170 can provide full power used by the propulsion system 168 generate any given thrust by transferring torque to the low pressure shaft 114 through the fan stage 108 (e.g., rotor integrated fan blades, as provided as a described example above). The electric motor 170 can also provide a partial power required to generate any given thrust while the rest of the power comes from the combustion generated in the combustion section 128. In other embodiments, the electric motor 170 can also operate as a generator by capturing power from the low pressure shaft 114 through fan stage 108 (e.g., through rotor integrated fan blades). Likewise, through a combination of motoring/generating operations (similar to that outlined with respect to FIG. 13), the electric motor 170 can increase the overall operational efficiency of the engine (e.g., the propulsion system 168).

Furthermore, it should be noted that the electric motor 166 and the electric motor 170 can work in tandem to supplement rotation provided by the low pressure shaft 114 in a hybrid mode or the low pressure shaft 114 can be disengaged from either or both of the fan stage 106 and the fan stage 108 and the electric motor 166 and the electric motor 170 can together provide rotation to the respective fan blade of the fan stage 106 and the fan blade of the fan stage 108 in an electric mode.

Likewise, the electric motor 166 and the electric motor 170 in tandem can provide full power used by the propulsion system 168 generate any given thrust by transferring torque to the low pressure shaft 114 through the fan stage 106 and the fan stage 108 (e.g., rotor integrated fan blades, as provided as a described example above). The electric motor 166 and the electric motor 170 can also provide a partial power required to generate any given thrust while the rest of the power comes from the combustion generated in the combustion section 128. In other embodiments, the electric motor 166 and the electric motor 170 can also operate as a generator by capturing power from the low pressure shaft 114 through fan stage 106 and fan stage 108 respectively (e.g., through rotor integrated fan blades). Likewise, through a combination of motoring/generating operations (similar to that outlined with respect to FIG. 13), the electric motor 166 and the electric motor 170 can increase the overall operational efficiency of the engine (e.g., the propulsion system 168).

Figure 19:
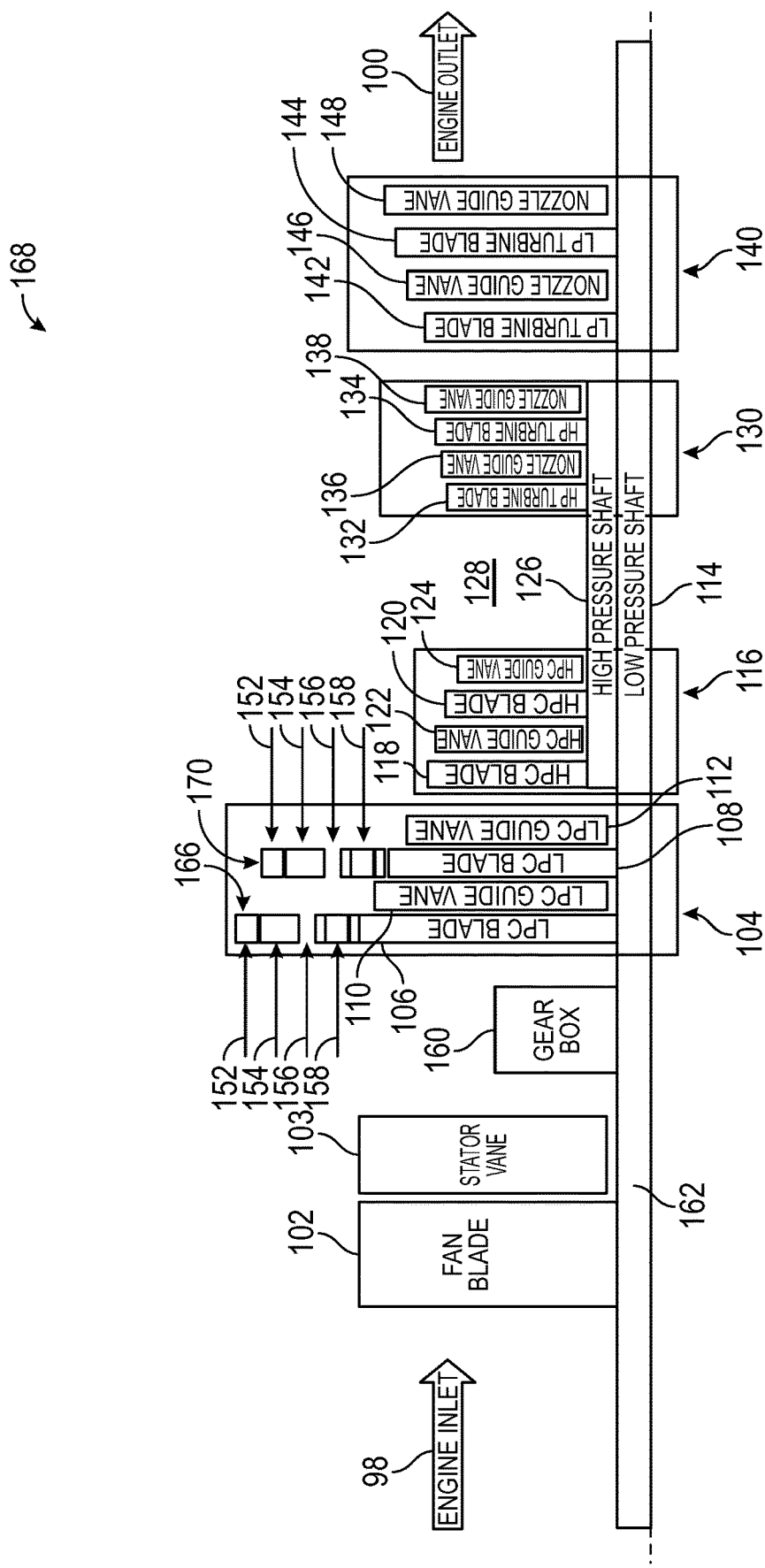
FIG. 19 illustrates a second embodiment of the ninth propulsion system of FIG. 18, in accordance with an embodiment.

FIG. 19 illustrates a second embodiment of propulsion system 168 that may be used in conjunction with, for example, an aircraft. In addition to the elements described above with respect to FIG. 18, the second embodiment of propulsion system 168 additionally includes a reduction gearbox 160 as well as a drive shaft 162. In operation, the low pressure shaft 114 is coupled to the reduction gearbox 160, which may operate to transmit rotation from the low pressure shaft 114 to the drive shaft 162 coupled to the fan stage 102. The reduction gearbox 160 may operate as a gearing mechanism that alters the rotation speed between the low pressure shaft 114 and the drive shaft 162.

Figure 20:
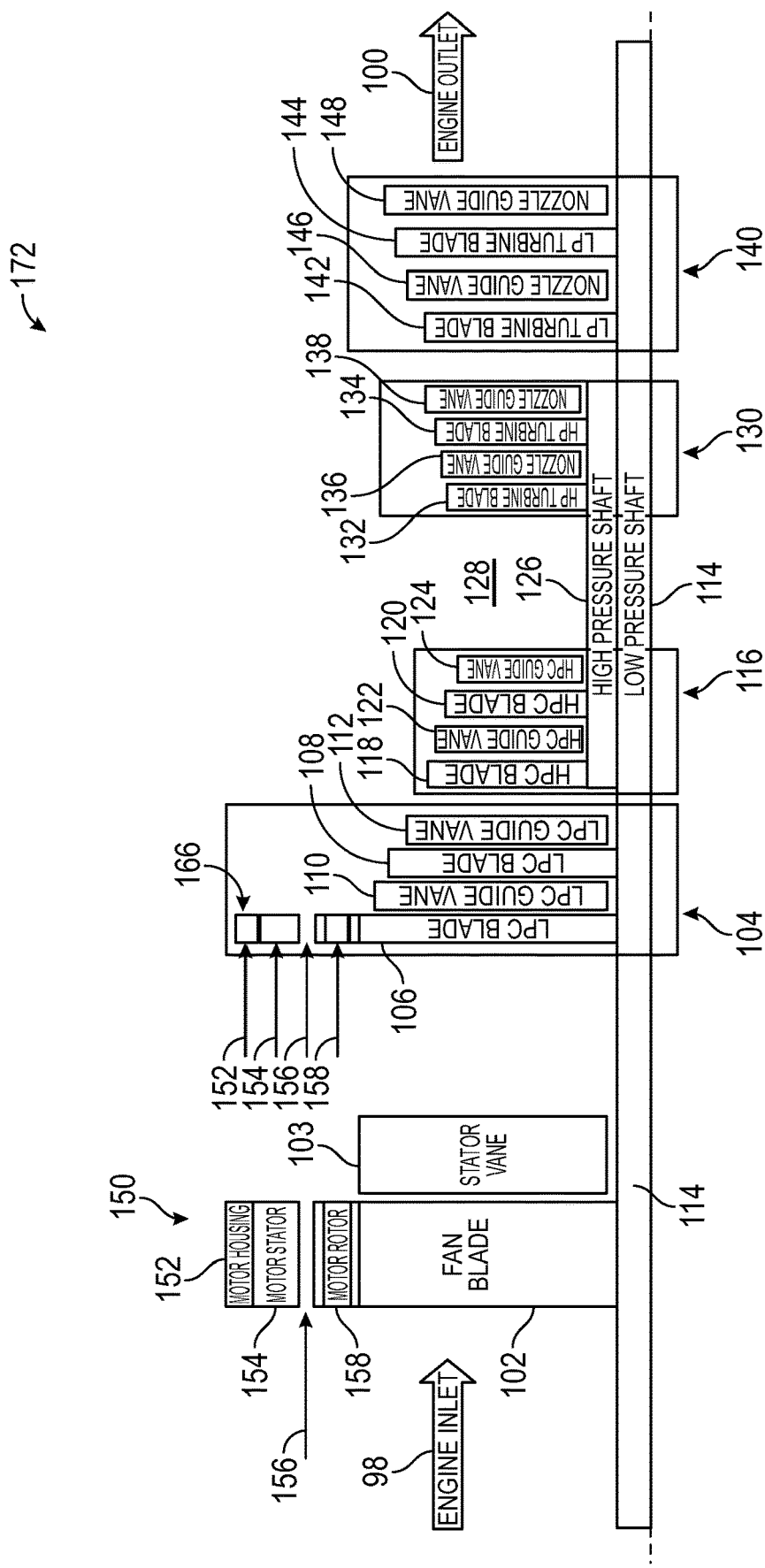
FIG. 20 illustrates a tenth propulsion system, in accordance with an embodiment.

FIG. 20 illustrates a propulsion system 172 that may be used in conjunction with, for example, an aircraft. In some embodiments, the propulsion system 172 is a jet engine for an aircraft that is a gas powered engine. The propulsion system 172 includes an engine inlet 98 and an engine outlet 100 that illustrate a fluid flow path in the propulsion system 172. Air may pass through a fan stage 102 and may flow towards a low pressure compressor stage 104 of the propulsion system 172. In operation, the fan stage 102 has rotating fan blades that operate to draw and/or direct air into the propulsion system 172 and pass it downstream to the low pressure compressor stage 104. Additionally, in some embodiments, a guide vane 103 may be disposed downstream of and adjacent to the fan stage 102. The guide vane 103 operates to guide or otherwise channel air that has passed through the respective fan stage 102 downstream to, for example, the low pressure compressor stage 104.

The low pressure compressor stage 104 may operate to initially compress air received from the fan stage 102. The low pressure compressor stage 104 can include, for example, a fan stage 106 and a fan stage 108, each having rotating fan blades that operate to compress the received air as it passes therethrough. Fan stage 106 and the fan stage 108 thus represent a series of fans, each containing rotating fan blades that each operate to compress air it has received as it passes through each of the fan stage 106 and the fan stage 108 (e.g., through each stage of compression). Additionally present in the low pressure compressor stage 104 are illustrated guide vane 110 and guide vane 112 that correspond to each of fan stage 106 and fan stage 108, respectively. The guide vane 110 and the guide vane 112 each operate to guide or otherwise channel air that has passed through the respective fan stage 106 and fan stage 108. As illustrated, the fan stage 106 and the fan stage 108 are directly connected to a common shaft, the low pressure shaft 114, which operates to impart rotation to the fan stage 106 and the fan stage 108. As additionally illustrated, the low pressure shaft 114 can be additionally coupled to the fan stage 102.

Subsequent to (e.g., downstream from) the low pressure compressor stage 104 is a high pressure compressor stage 116. The high pressure compressor stage 116 may operate to additionally compress the low pressure compressed air received from the low pressure compressor stage 104 to an increased (higher) pressure level. The high pressure compressor stage 116 can include, for example, a fan stage 118 and a fan stage 120, each having rotating fan blades that operate to compress the received air as it passes therethrough. Fan stage 118 and the fan stage 120 thus represent a series of fans (similar to fan stage 106 and fan stage 108), each containing rotating fan blades that each operate to compress air it has received as it passes through each of the fan stage 118 and the fan stage 120 (e.g., through each stage of compression). Additionally present in the high pressure compressor stage 116 are illustrated guide vane 122 and guide vane 124 that correspond to each of fan stage 118 and fan stage 120, respectively. The guide vane 122 and the guide vane 124 each operate to guide or otherwise channel air that has passed through the respective fan stage 118 and fan stage 120. As illustrated, the fan stage 118 and the fan stage 120 are directly connected to a common shaft, the high pressure shaft 126, which operates to impart rotation to the fan stage 118 and the fan stage 120. In some embodiments, the high pressure shaft 126 rotates more rapidly than the low pressure shaft 114 which, for example, allows for the high pressure compressor stage 116 to compress received air to a higher pressure than possible by the low pressure compressor stage 104 driven by the low pressure shaft 114.

The propulsion system 172 additionally includes a combustion section 128 that receives the compressed air from the high pressure compressor stage 116, mixes the compressed air with fuel, and ignites the mixture to generate a combustion gas utilizing a combustor. This combustion gas can be utilized to power multiple turbines downstream of the combustion section 128 and passes as exhaust out of the engine outlet 100.

As illustrated, downstream of the combustion section 128 is a high pressure turbine stage 130. The high pressure turbine stage 130 may operate to impart rotation to the high pressure shaft 126. The high pressure turbine stage 130 can include, for example, a turbine stage 132 and a turbine stage 134, each having rotating fan blades that operate to receive energy as the combustion gas passes through each of the turbine stage 132 and the turbine stage 134 (e.g., through each turbine stage). Additionally present in the high pressure turbine stage 130 are illustrated guide vane 136 and guide vane 138 that correspond to each of turbine stage 132 and turbine stage 134, respectively. The guide vane 136 and the guide vane 138 each operate to guide or otherwise channel combustion gas that has passed through the respective turbine stage 132 and turbine stage 134. As illustrated, the turbine stage 132 and the turbine stage 134 are directly connected to a common shaft, the high pressure shaft 126, and the turbine stage 132 and the turbine stage 134 operate to impart rotation to the high pressure shaft 126.

The combustion gas may exit the high pressure turbine stage 130 and may flow to the low pressure turbine stage 140. The low pressure turbine stage 140 may operate to impart rotation to the low pressure shaft 114. The low pressure turbine stage 140 can include, for example, a turbine stage 142 and a turbine stage 144, each having rotating fan blades that operate to receive energy as the combustion gas passes through each of the turbine stage 142 and the turbine stage 144 (e.g., through each turbine stage). Additionally present in the low pressure turbine stage 140 are illustrated guide vane 146 and guide vane 148 that correspond to each of turbine stage 142 and turbine stage 144, respectively. The guide vane 146 and the guide vane 148 each operate to guide or otherwise channel combustion gas that has passed through the respective turbine stage 142 and turbine stage 144. As illustrated, the turbine stage 142 and the turbine stage 144 are directly connected to a common shaft, the low pressure shaft 114, and the turbine stage 142 and the turbine stage 144 operate to impart rotation to the low pressure shaft 114 at a rotation speed lower than the rotation speed imparted to the high pressure shaft 126 due to, for example, lesser energy being present in the combustion gas (due to the reduced temperature of the combustion gas) when in the low pressure turbine stage 140 relative to the high pressure turbine stage 130.

As noted above, present embodiments include techniques for hybridization of the propulsion system 172. For example, the propulsion system 172 can include an electric motor 150 that operates in conjunction with the above described elements of the propulsion system 172. For example, the electric motor 150 can be a front fan integrated motor that is disposed adjacent to the fan stage 102. As illustrated, the electric motor 150 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 102. Alternatively, the motor stator 154 and motor rotor 158 may be operated as an electric generator. For example, during a descent or landing of an aircraft, the motor stator 154 may be operated to generate resistance to the rotation of fan stage 102. This may result in reduced net thrust provided by propulsion system 172, leading to a reduction in the aircraft's speed. This may also result in the generation of electrical power, which may be used e.g., to charge one or more power sources (e.g., electrochemical batteries) on board the aircraft.

In some embodiments, the fan stage 102 is integrated fan blade whereby the motor rotor 158 has its rotor magnet(s) positioned about a fan shroud encircling the fan stage 102, which may be held in position (in some embodiments), via a compressive sleeve. Thus, the electric motor 150 provides torque directly to the integrated fan blade through the motor rotor 158, thereby allowing for hybrid and/or full electric operation. That is, the electric motor 150 can supplement rotation provided by the low pressure shaft 114 in a hybrid mode or the low pressure shaft 114 can be disengaged from the fan stage 102 and the electric motor 150 can solely provide rotation to the fan blade of the fan stage 102 in an electric mode.

Likewise, the electric motor 150 can provide full power used by the propulsion system 172 generate any given thrust by transferring torque to the low pressure shaft 114 through the fan stage 102 (e.g., rotor integrated fan blades, as provided as a described example above). The electric motor 150 can also provide a partial power required to generate any given thrust while the rest of the power comes from the combustion generated in the combustion section 128. In other embodiments, the electric motor 150 can also operate as a generator by capturing power from the low pressure shaft 114 through fan stage 102 (e.g., through rotor integrated fan blades). Likewise, through a combination of motoring/generating operations (similar to that outlined with respect to FIG. 13), the electric motor 150 can increase the overall operational efficiency of the engine (e.g., the propulsion system 172).

Additionally, the propulsion system 172 can include an additional electric motor 166 that operates in conjunction with the above described elements of the propulsion system 172. In some embodiments, electric motor 166 can be similar to electric motor 150. Additionally, for example, the electric motor 166 can be a low pressure compressor blade integrated motor that is disposed adjacent to the low pressure compressor stage 104. More particularly, the electric motor 166 can be coupled to the fan stage 106 or, for example, a blade or fan therein. As illustrated, the electric motor 166 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 106. Alternatively, the motor stator 154 and motor rotor 158 may be operated as an electric generator. For example, during a descent or landing of an aircraft, the motor stator 154 may be operated to generate resistance to the rotation of fan stage 106. This may result in reduced net thrust provided by propulsion system 172, leading to a reduction in the aircraft's speed. This may also result in the generation of electrical power, which may be used e.g., to charge one or more power sources (e.g., electrochemical batteries) on board the aircraft.

In some embodiments, the fan stage 106 is integrated fan blade whereby the motor rotor 158 has its rotor magnet(s) positioned about a fan shroud encircling the fan stage 106, which may be held in position (in some embodiments), via a compressive sleeve. Thus, the electric motor 166 provides torque directly to the integrated fan blade through the motor rotor 158, thereby allowing for hybrid and/or full electric operation. That is, the electric motor 166 can supplement rotation provided by the low pressure shaft 114 in a hybrid mode or the low pressure shaft 114 can be disengaged from the fan stage 106 and the electric motor 166 can solely provide rotation to the fan blade of the fan stage 106 in an electric mode.

Likewise, the electric motor 166 can provide full power used by the propulsion system 172 generate any given thrust by transferring torque to the low pressure shaft 114 through the fan stage 106 (e.g., rotor integrated fan blades, as provided as a described example above). The electric motor 166 can also provide a partial power required to generate any given thrust while the rest of the power comes from the combustion generated in the combustion section 128. In other embodiments, the electric motor 166 can also operate as a generator by capturing power from the low pressure shaft 114 through fan stage 106 (e.g., through rotor integrated fan blades). Likewise, through a combination of motoring/generating operations (similar to that outlined with respect to FIG. 13), the electric motor 166 can increase the overall operational efficiency of the engine (e.g., the propulsion system 172).

Furthermore, it should be noted that the electric motor 150 and the electric motor 166 can work in tandem to supplement rotation provided by the low pressure shaft 114 in a hybrid mode or the low pressure shaft 114 can be disengaged from either or both of the fan stage 102 and the fan stage 106 and the electric motor 150 and the electric motor 166 can together provide rotation to the respective fan blade of the fan stage 102 and the fan blade of the fan stage 106 in an electric mode.

Likewise, the electric motor 150 and the electric motor 166 in tandem can provide full power used by the propulsion system 172 generate any given thrust by transferring torque to the low pressure shaft 114 through the fan stage 102 and the fan stage 106 (e.g., rotor integrated fan blades, as provided as a described example above). The electric motor 150 and the electric motor 166 can also provide a partial power required to generate any given thrust while the rest of the power comes from the combustion generated in the combustion section 128. In other embodiments, the electric motor 150 and the electric motor 166 can also operate as a generator by capturing power from the low pressure shaft 114 through fan stage 102 and fan stage 106, respectively (e.g., through rotor integrated fan blades). Likewise, through a combination of motoring/generating operations (similar to that outlined with respect to FIG. 13), the electric motor 150 and the electric motor 166 can increase the overall operational efficiency of the engine (e.g., the propulsion system 172).

Figure 21:
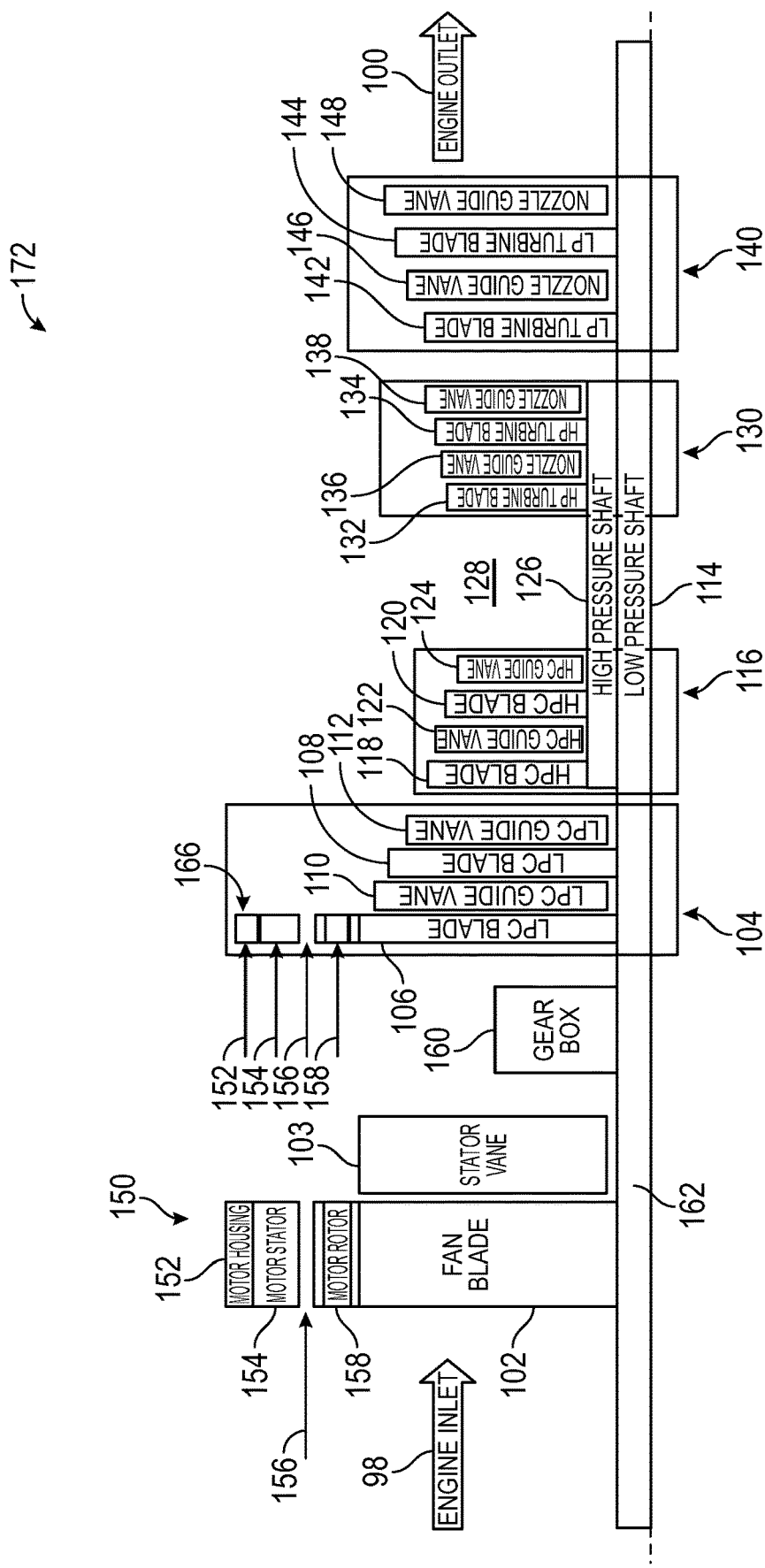
FIG. 21 illustrates a second embodiment of the tenth propulsion system of FIG. 20, in accordance with an embodiment.

FIG. 21 illustrates a second embodiment of propulsion system 172 that may be used in conjunction with, for example, an aircraft. In addition to the elements described above with respect to FIG. 20, the second embodiment of propulsion system 172 additionally includes a reduction gearbox 160 as well as a drive shaft 162. In operation, the low pressure shaft 114 is coupled to the reduction gearbox 160, which may operate to transmit rotation from the low pressure shaft 114 to the drive shaft 162 coupled to the fan stage 102. The reduction gearbox 160 may operate as a gearing mechanism that alters the rotation speed between the low pressure shaft 114 and the drive shaft 162.

Figure 22:
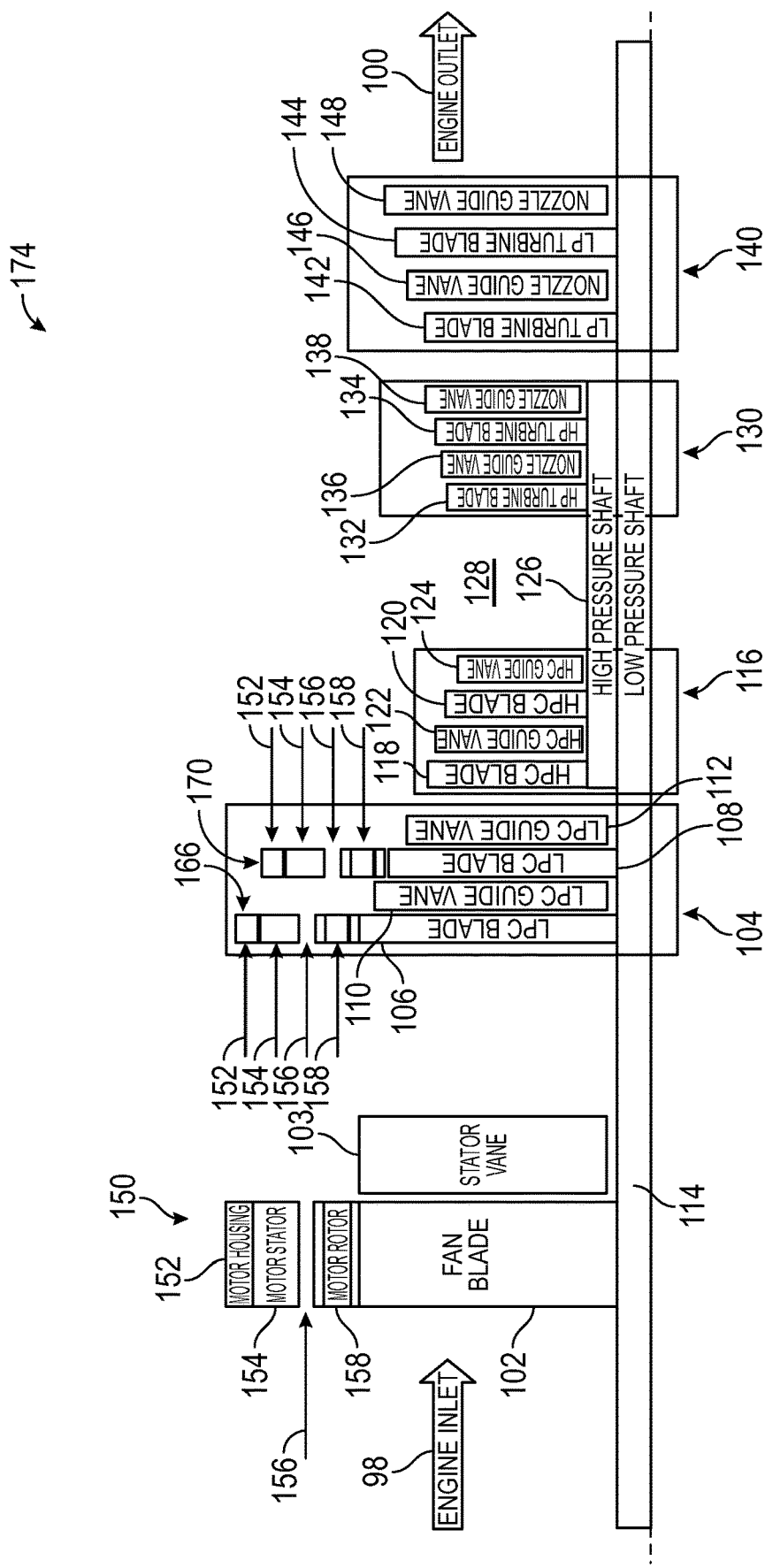
FIG. 22 illustrates an eleventh propulsion system, in accordance with an embodiment.

FIG. 22 illustrates a propulsion system 174 that may be used in conjunction with, for example, an aircraft. In some embodiments, the propulsion system 174 is a jet engine for an aircraft that is a gas powered engine. The propulsion system 174 includes an engine inlet 98 and an engine outlet 100 that illustrate a fluid flow path in the propulsion system 174. Air may pass through a fan stage 102 and may flow towards a low pressure compressor stage 104 of the propulsion system 174. In operation, the fan stage 102 has rotating fan blades that operate to draw and/or direct air into the propulsion system 174 and pass it downstream to the low pressure compressor stage 104. Additionally, in some embodiments, a guide vane 103 may be disposed downstream of and adjacent to the fan stage 102. The guide vane 103 operates to guide or otherwise channel air that has passed through the respective fan stage 102 downstream to, for example, the low pressure compressor stage 104.

The low pressure compressor stage 104 may operate to initially compress air received from the fan stage 102. The low pressure compressor stage 104 can include, for example, a fan stage 106 and a fan stage 108, each having rotating fan blades that operate to compress the received air as it passes therethrough. Fan stage 106 and the fan stage 108 thus represent a series of fans, each containing rotating fan blades that each operate to compress air it has received as it passes through each of the fan stage 106 and the fan stage 108 (e.g., through each stage of compression). Additionally present in the low pressure compressor stage 104 are illustrated guide vane 110 and guide vane 112 that correspond to each of fan stage 106 and fan stage 108, respectively. The guide vane 110 and the guide vane 112 each operate to guide or otherwise channel air that has passed through the respective fan stage 106 and fan stage 108. As illustrated, the fan stage 106 and the fan stage 108 are directly connected to a common shaft, the low pressure shaft 114, which operates to impart rotation to the fan stage 106 and the fan stage 108. As additionally illustrated, the low pressure shaft 114 can be additionally coupled to the fan stage 102.

Subsequent to (e.g., downstream from) the low pressure compressor stage 104 is a high pressure compressor stage 116. The high pressure compressor stage 116 may operate to additionally compress the low pressure compressed air received from the low pressure compressor stage 104 to an increased (higher) pressure level. The high pressure compressor stage 116 can include, for example, a fan stage 118 and a fan stage 120, each having rotating fan blades that operate to compress the received air as it passes therethrough. Fan stage 118 and the fan stage 120 thus represent a series of fans (similar to fan stage 106 and fan stage 108), each containing rotating fan blades that each operate to compress air it has received as it passes through each of the fan stage 118 and the fan stage 120 (e.g., through each stage of compression). Additionally present in the high pressure compressor stage 116 are illustrated guide vane 122 and guide vane 124 that correspond to each of fan stage 118 and fan stage 120, respectively. The guide vane 122 and the guide vane 124 each operate to guide or otherwise channel air that has passed through the respective fan stage 118 and fan stage 120. As illustrated, the fan stage 118 and the fan stage 120 are directly connected to a common shaft, the high pressure shaft 126, which operates to impart rotation to the fan stage 118 and the fan stage 120. In some embodiments, the high pressure shaft 126 rotates more rapidly than the low pressure shaft 114 which, for example, allows for the high pressure compressor stage 116 to compress received air to a higher pressure than possible by the low pressure compressor stage 104 driven by the low pressure shaft 114.

The propulsion system 174 additionally includes a combustion section 128 that receives the compressed air from the high pressure compressor stage 116, mixes the compressed air with fuel, and ignites the mixture to generate a combustion gas utilizing a combustor. This combustion gas can be utilized to power multiple turbines downstream of the combustion section 128 and passes as exhaust out of the engine outlet 100.

As illustrated, downstream of the combustion section 128 is a high pressure turbine stage 130. The high pressure turbine stage 130 may operate to impart rotation to the high pressure shaft 126. The high pressure turbine stage 130 can include, for example, a turbine stage 132 and a turbine stage 134, each having rotating fan blades that operate to receive energy as the combustion gas passes through each of the turbine stage 132 and the turbine stage 134 (e.g., through each turbine stage). Additionally present in the high pressure turbine stage 130 are illustrated guide vane 136 and guide vane 138 that correspond to each of turbine stage 132 and turbine stage 134, respectively. The guide vane 136 and the guide vane 138 each operate to guide or otherwise channel combustion gas that has passed through the respective turbine stage 132 and turbine stage 134. As illustrated, the turbine stage 132 and the turbine stage 134 are directly connected to a common shaft, the high pressure shaft 126, and the turbine stage 132 and the turbine stage 134 operate to impart rotation to the high pressure shaft 126.

The combustion gas may exit the high pressure turbine stage 130 and may flow to the low pressure turbine stage 140. The low pressure turbine stage 140 may operate to impart rotation to the low pressure shaft 114. The low pressure turbine stage 140 can include, for example, a turbine stage 142 and a turbine stage 144, each having rotating fan blades that operate to receive energy as the combustion gas passes through each of the turbine stage 142 and the turbine stage 144 (e.g., through each turbine stage). Additionally present in the low pressure turbine stage 140 are illustrated guide vane 146 and guide vane 148 that correspond to each of turbine stage 142 and turbine stage 144, respectively. The guide vane 146 and the guide vane 148 each operate to guide or otherwise channel combustion gas that has passed through the respective turbine stage 142 and turbine stage 144. As illustrated, the turbine stage 142 and the turbine stage 144 are directly connected to a common shaft, the low pressure shaft 114, and the turbine stage 142 and the turbine stage 144 operate to impart rotation to the low pressure shaft 114 at a rotation speed lower than the rotation speed imparted to the high pressure shaft 126 due to, for example, lesser energy being present in the combustion gas (due to the reduced temperature of the combustion gas) when in the low pressure turbine stage 140 relative to the high pressure turbine stage 130.

As noted above, present embodiments include techniques for hybridization of the propulsion system 174. For example, the propulsion system 174 can include an electric motor 150 that operates in conjunction with the above described elements of the propulsion system 174. For example, the electric motor 150 can be a front fan integrated motor that is disposed adjacent to the fan stage 102. As illustrated, the electric motor 150 includes a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 102. Alternatively, the motor stator 154 and motor rotor 158 may be operated as an electric generator. For example, during a descent or landing of an aircraft, the motor stator 154 may be operated to generate resistance to the rotation of fan stage 102. This may result in reduced net thrust provided by propulsion system 174, leading to a reduction in the aircraft's speed. This may also result in the generation of electrical power, which may be used e.g., to charge one or more power sources (e.g., electrochemical batteries) on board the aircraft.

In some embodiments, the fan stage 102 is integrated fan blade whereby the motor rotor 158 has its rotor magnet(s) positioned about a fan shroud encircling the fan stage 102, which may be held in position (in some embodiments), via a compressive sleeve. Thus, the electric motor 150 provides torque directly to the integrated fan blade through the motor rotor 158, thereby allowing for hybrid and/or full electric operation. That is, the electric motor 150 can supplement rotation provided by the low pressure shaft 114 in a hybrid mode or the low pressure shaft 114 can be disengaged from the fan stage 102 and the electric motor 150 can solely provide rotation to the fan blade of the fan stage 102 in an electric mode.

Likewise, the electric motor 150 can provide full power used by the propulsion system 174 generate any given thrust by transferring torque to the low pressure shaft 114 through the fan stage 102 (e.g., rotor integrated fan blades, as provided as a described example above). The electric motor 150 can also provide a partial power required to generate any given thrust while the rest of the power comes from the combustion generated in the combustion section 128. In other embodiments, the electric motor 150 can also operate as a generator by capturing power from the low pressure shaft 114 through fan stage 102 (e.g., through rotor integrated fan blades). Likewise, through a combination of motoring/generating operations (similar to that outlined with respect to FIG. 13), the electric motor 150 can increase the overall operational efficiency of the engine (e.g., the propulsion system 174).

Additionally, the propulsion system 174 can additionally include electric motor 166 and electric motor 170, which operate in conjunction with the above described elements of the propulsion system 174. In some embodiments, one or both of electric motor 166 and electric motor 170 can be similar to electric motor 150. Additionally, for example, the electric motor 166 can be a low pressure compressor blade integrated motor that is disposed adjacent to the low pressure compressor stage 104. More particularly, the electric motor 166 can be coupled to the fan stage 106 or, for example, a blade or fan therein. Similarly, for example, the electric motor 170 can be a low pressure compressor blade integrated motor that is disposed adjacent to the low pressure compressor stage 104. More particularly, the electric motor 170 can be coupled to the fan stage 108 or, for example, a blade or fan therein. As illustrated, each of the electric motor 166 and the electric motor 170 include a motor housing 152 that surrounds a motor stator 154. An airgap 156 may be provided adjacent to the motor stator 154 to provide cooling fluid (e.g., air) and a motor rotor 158 may also be included in the electric motor 150.

In operation, the motor stator 154 may include windings while the motor rotor 158 includes one or more magnets. The motor stator 154 and motor rotor 158 may be operated as an electric motor, where electrical power is applied to rotate fan blades of the fan stage 106 or the fan stage 108, respectively. Alternatively, the motor stator 154 and motor rotor 158 may be operated as an electric generator. For example, during a descent or landing of an aircraft, the motor stator 154 may be operated to generate resistance to the rotation of fan stage 106 and/or fan stage 108, respectively. This may result in reduced net thrust provided by propulsion system 174, leading to a reduction in the aircraft's speed. This may also result in the generation of electrical power, which may be used e.g., to charge one or more power sources (e.g., electrochemical batteries) on board the aircraft.

In some embodiments, the fan stage 106 is integrated fan blade whereby the motor rotor 158 has its rotor magnet(s) positioned about a fan shroud encircling the fan stage 106, which may be held in position (in some embodiments), via a compressive sleeve. Thus, the electric motor 166 provides torque directly to the integrated fan blade through the motor rotor 158, thereby allowing for hybrid and/or full electric operation. That is, the electric motor 166 can supplement rotation provided by the low pressure shaft 114 in a hybrid mode or the low pressure shaft 114 can be disengaged from the fan stage 106 and the electric motor 166 can solely provide rotation to the fan blade of the fan stage 106 in an electric mode.

Likewise, in some embodiments, the fan stage 108 is integrated fan blade whereby the motor rotor 158 has its rotor magnet(s) positioned about a fan shroud encircling the fan stage 108, which may be held in position (in some embodiments), via a compressive sleeve. Thus, the electric motor 170 provides torque directly to the integrated fan blade through the motor rotor 158, thereby allowing for hybrid and/or full electric operation. That is, the electric motor 170 can supplement rotation provided by the low pressure shaft 114 in a hybrid mode or the low pressure shaft 114 can be disengaged from the fan stage 108 and the electric motor 170 can solely provide rotation to the fan blade of the fan stage 108 in an electric mode.

Additionally, the electric motor 166 and/or the electric motor 170 can provide full power used by the propulsion system 174 generate any given thrust by transferring torque to the low pressure shaft 114 through the fan stage 106 or the fan stage 108, respectively (e.g., rotor integrated fan blades, as provided as a described example above). The electric motor 166 and/or the electric motor 170 can also provide a partial power required to generate any given thrust while the rest of the power comes from the combustion generated in the combustion section 128. In other embodiments, the electric motor 166 and/or the electric motor 170 can also operate as a generator by capturing power from the low pressure shaft 114 through fan stage 106 or fan stage 108, respectively (e.g., through rotor integrated fan blades). Likewise, through a combination of motoring/generating operations (similar to that outlined with respect to FIG. 13), the electric motor 166 and/or the electric motor 170 can increase the overall operational efficiency of the engine (e.g., the propulsion system 174).

Furthermore, it should be noted that two or more of the electric motor 150, the electric motor 166, and/or the electric motor 170 can work in tandem to supplement rotation provided by the low pressure shaft 114 in a hybrid mode or the low pressure shaft 114 can be disengaged from either, both, or all of the fan stage 102, the fan stage 106, and the fan stage 108 and the two or more of the electric motor 150, the electric motor 166, and/or the electric motor 170 can together provide rotation to the respective fan blade of the fan stage 102, the fan blade of the fan stage 106, and the fan blade of the fan stage 108 in an electric mode.

Likewise, two or more of the electric motor 150, the electric motor 166, and/or the electric motor 170 can work in tandem to provide full power used by the propulsion system 174 to generate any given thrust by transferring torque to the low pressure shaft 114 through the respective fan stage 102, fan stage 106, and the fan stage 108 (e.g., rotor integrated fan blades, as provided as a described example above). Two or more of the electric motor 150, the electric motor 166, and/or the electric motor 170 can also provide a partial power required to generate any given thrust while the rest of the power comes from the combustion generated in the combustion section 128. In other embodiments, two or more of the electric motor 150, the electric motor 166, and/or the electric motor 170 can also operate as a generator by capturing power from the low pressure shaft 114 respectively through fan stage 102, fan stage 106, and fan stage 108 (e.g., through rotor integrated fan blades). Likewise, through a combination of motoring/generating operations (similar to that outlined with respect to FIG. 13), two or more of the electric motor 150, the electric motor 166, and/or the electric motor 170 can increase the overall operational efficiency of the engine (e.g., the propulsion system 174).

Figure 23:
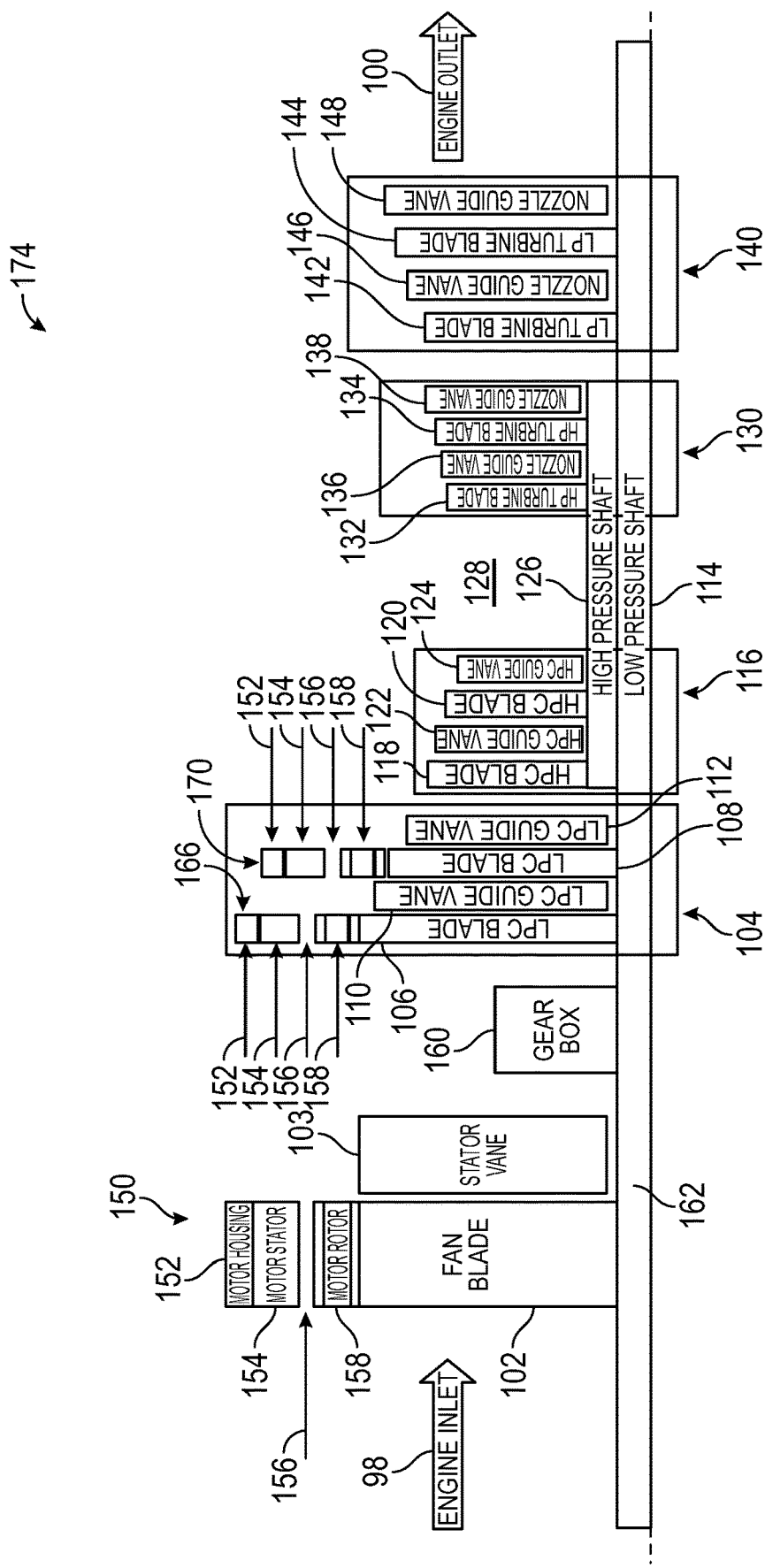
FIG. 23 illustrates a second embodiment of the eleventh propulsion system of FIG. 22, in accordance with an embodiment.

FIG. 23 illustrates a second embodiment of propulsion system 174 that may be used in conjunction with, for example, an aircraft. In addition to the elements described above with respect to FIG. 22, the second embodiment of propulsion system 174 additionally includes a reduction gearbox 160 as well as a drive shaft 162. In operation, the low pressure shaft 114 is coupled to the reduction gearbox 160, which may operate to transmit rotation from the low pressure shaft 114 to the drive shaft 162 coupled to the fan stage 102. The reduction gearbox 160 may operate as a gearing mechanism that alters the rotation speed between the low pressure shaft 114 and the drive shaft 162.

It should further be noted that each of the electric motor 150, electric motor 166, and electric motor 170 may be coupled to a power source 60 that is coupled to a controller 62, similar to the power source 60 and controller 62 illustrated in FIGS. 4, 6, 8, 10, and 12. Additionally where more than one of the electric motor 150, electric motor 166, and electric motor 170 is present (e.g., in the propulsion system 168, the propulsion system 172, and/or the propulsion system 174) each of respective electric motor 150, electric motor 166, and electric motor 170 present in the propulsion system 168, the propulsion system 172, and/or the propulsion system 174 can be coupled to its own power source 60 and its own controller 62. Alternatively, where more than one of the electric motor 150, electric motor 166, and electric motor 170 is present (e.g., in the propulsion system 168, the propulsion system 172, and/or the propulsion system 174) two or more of the electric motor 150, electric motor 166, and electric motor 170 present in the propulsion system 168, the propulsion system 172, and/or the propulsion system 174 can be coupled to a common power source 60 and common controller 62.

This written description uses examples to disclose the above description to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A system, comprising:
   a first electric motor that when in operation imparts rotation to a fan stage of an engine, wherein the fan stage comprises a plurality of integrated fan blades and a fan shroud encircling the integrated fan blades, wherein the first electric motor comprises:
   one or more rotor magnets positioned about the fan shroud encircling the fan stage,
   a compressive sleeve configured to hold the one or more rotor magnets in position about the fan shroud, and
   a stator supported by a motor housing, wherein the fan shroud is located radially inward from the stator and separated from the stator and the motor housing by a gap configured to allow a flow of cooling air through the gap;
   a combustion section of the engine comprising a combustor that when in operation generates combustion gas through ignition of fuel and compressed air; and
   a turbine of the engine coupled to a shaft of the engine, wherein the turbine when in operation receives the combustion gas from the combustion section and imparts rotation to the shaft using the combustion gas.

2. The system of claim 1, wherein the first electric motor is disposed about the integrated fan blade to provide torque directly to the integrated fan blade.

3. The system of claim 1 comprising a second electric motor that when in operation imparts rotation to a second fan stage of the engine.

4. The system of claim 3, wherein the second fan stage comprises a second integrated fan blade.

5. The system of claim 4, wherein the second electric motor is disposed about the second integrated fan blade to provide torque directly to the second integrated fan blade.

6. The system of claim 5, comprising a second shaft coupled to the integrated fan blade and the second integrated fan blade, wherein the torque provided to the integrated fan blade and the second integrated fan blade is imparted to the second shaft.

7. The system of claim 5, comprising:
   a second shaft coupled to the integrated fan blade, wherein the torque provided to the integrated fan blade is imparted to the second shaft.

8. The system of claim 1, wherein the first electric motor comprises a stator and a one or more rotors.

9. A system, comprising:
   an electric motor that when in operation imparts rotation to a fan stage of an engine, wherein the fan stage comprises a plurality of integrated fan blades and a fan shroud encircling the integrated fan blades, wherein the first electric motor comprises:
   one or more rotor magnets positioned about the fan shroud encircling the fan stage,
   a compressive sleeve configured to hold the one or more rotor magnets in position about the fan shroud, and a stator supported by a motor housing, wherein the fan shroud is located radially inward from the stator and separated from the stator and the motor housing by a gap configured to allow a flow of cooling air through the gap;

a combustion section of the engine comprising a combustor that when in operation generates combustion gas through ignition of fuel and compressed air; and a turbine of the engine coupled to a shaft of the engine, wherein the turbine when in operation receives the combustion gas from the combustion section and imparts rotation to the shaft using the combustion gas; and a controller coupled to the electric motor, wherein the controller when in operation controls an amount of power transmitted to the electric motor.

10. The system of claim 9, wherein the controller when in operation controls an amount of fuel provided to the combustion section in conjunction with control of the amount of power transmitted to the electric motor to facilitate hybrid operation of the engine.

\* \* \* \* \*